(12) United States Patent
Kitahashi et al.

(10) Patent No.: US 6,829,429 B1
(45) Date of Patent: Dec. 7, 2004

(54) VIDEO RECORDING DEVICE FOR RECORDING VIDEO SIGNAL INCLUDING CHARACTER INFORMATION

(75) Inventors: Masaki Kitahashi, Toyonaka (JP); Kazuhiko Nakamura, Hirakata (JP); Yoshiyuki Watanabe, Tokoname (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 950 days.

(21) Appl. No.: 09/726,402

(22) Filed: Dec. 1, 2000

(30) Foreign Application Priority Data

Dec. 2, 1999 (JP) ............................................ 11-343528

(51) Int. Cl.$^7$ .............................. H04N 5/91; H04N 9/80; H04N 11/00
(52) U.S. Cl. .............................. 386/95; 386/92; 386/95; 386/29; 348/468
(58) Field of Search .............................. 386/95, 46, 29, 386/92, 83; 348/461, 473, 468

(56) References Cited

U.S. PATENT DOCUMENTS

| | | | | |
|---|---|---|---|---|
| 5,153,742 A | * | 10/1992 | Rabii | ........................... 386/50 |
| 6,535,688 B1 | * | 3/2003 | Kawamura et al. | ........... 386/95 |

FOREIGN PATENT DOCUMENTS

| JP | 63-164072 | 7/1988 |
|---|---|---|
| JP | 6-205355 | 7/1994 |
| JP | 7-59043 | 3/1995 |
| JP | 8-307897 | 11/1996 |

\* cited by examiner

Primary Examiner—Thai Tran
Assistant Examiner—Jamie Vent
(74) Attorney, Agent, or Firm—Wenderoth, Lind & Ponack, L.L.P.

(57) ABSTRACT

A video recording device for recording a plurality of sets of video information including a plurality of sets of character information is provided. An ADC sequentially receives the plurality of sets of video information at a receive frequency. A character extracting unit extracts the plurality of sets of character information from the plurality of sets of video information. A video recording controlling unit outputs the plurality of sets of video information one at a time at a fixed output frequency without depending on the receive frequency, wherein the video recording controlling unit skips a set of video information or outputs an once-outputted set of video information when there is a discrepancy between the receive frequency and the output frequency. A character information recording controlling unit outputs the plurality of sets of character information one at a time at the output frequency. A recording unit records the outputted plurality of sets of video information and the outputted plurality of sets of video information, into the recording medium. Here, under a predetermined condition, the character information recording controlling unit judges whether a value included in an extracted set of character information is null, abandons the set of character information whose value is judged as being null, and instead outputs the next set of character information.

20 Claims, 18 Drawing Sheets

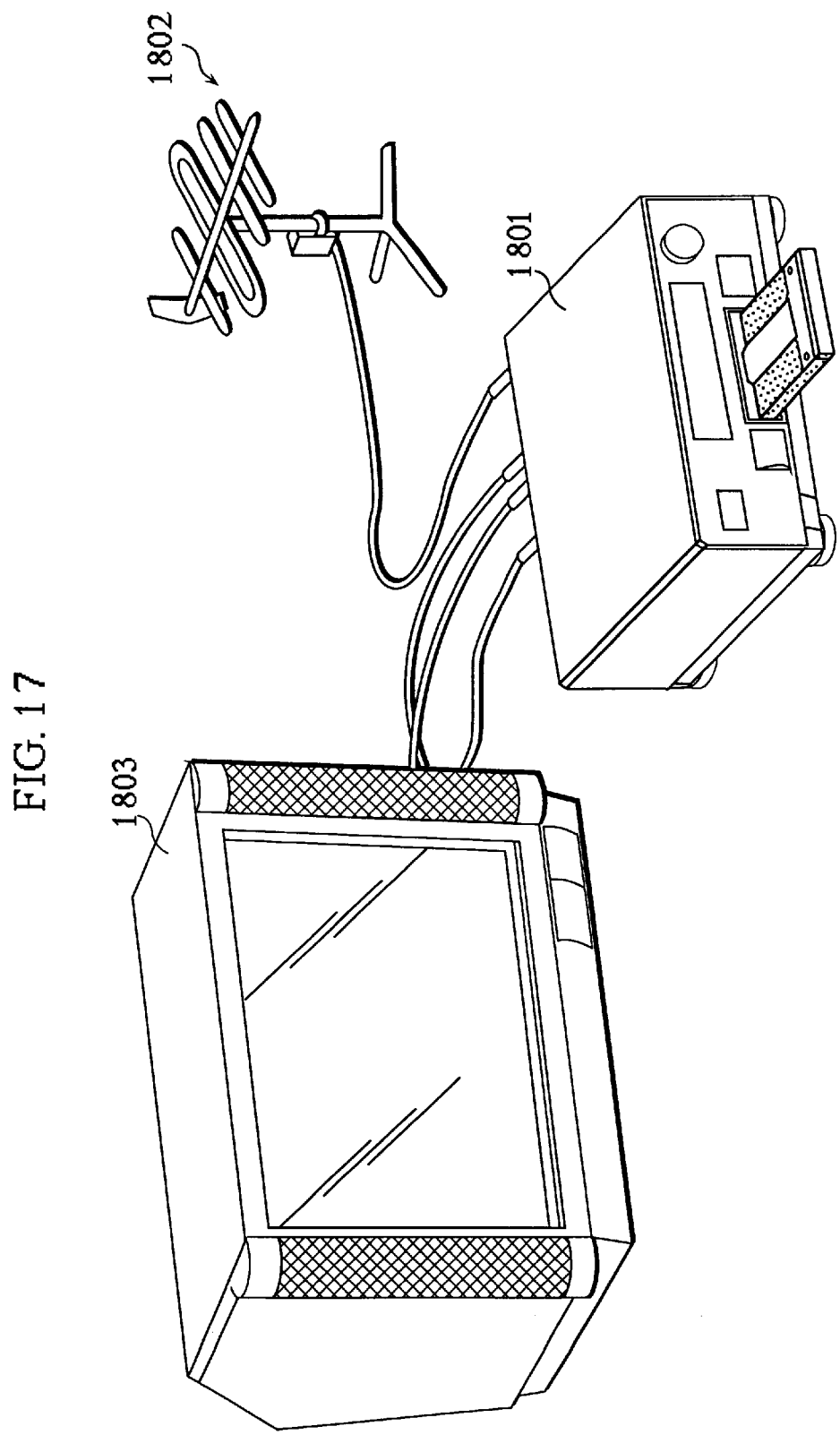

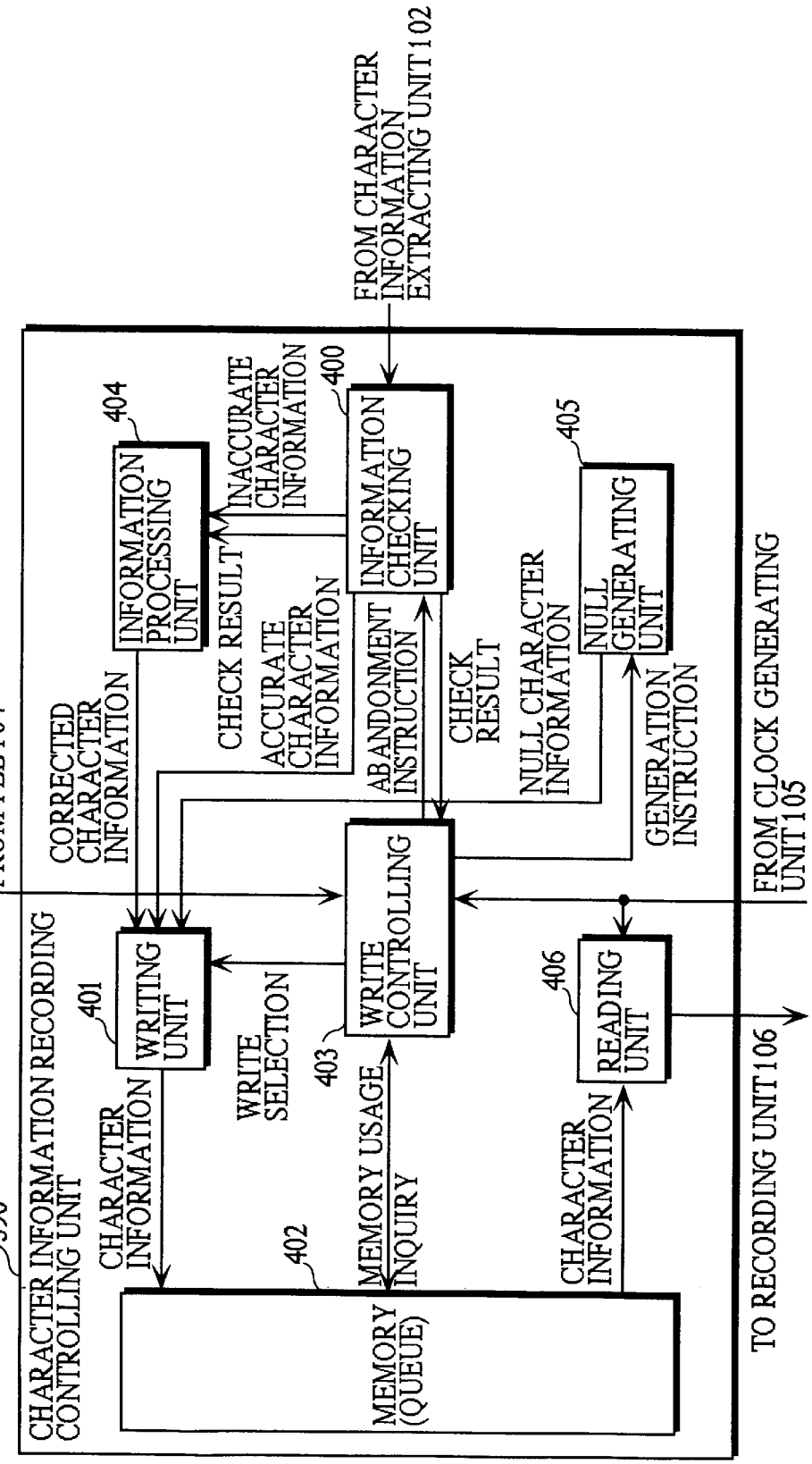

VIDEO RECORDING DEVICE FOR RECORDING VIDEO SIGNAL INCLUDING CHARACTER INFORMATION

This application is based on an application No. H11-343528 filed in Japan, the content of which is hereby incorporated by reference.

BACKGROUND OF THE INVENTION

1. Field of the Invention

The present invention relates to a video recording device for recording a video signal which includes character information such as closed caption data, and in particular relates to a technique of recording character information together with video information.

2. Prior Art

A video recording device equipped with a time base corrector (hereinafter, "TBC") is conventionally used to receive analog video signals outputted from a TV broadcaster or a video recorder on a frame-by-frame basis, convert the received analog video signals to digital video signals, and record them onto a recording medium such as a DVD.

In general, when converting an analog video signal to a digital video signal and recording it, the receive frequency of the video signal and the clock frequency which defines the timing of recording the video signal onto a recording medium (hereinafter, "reference frequency") do not synchronize precisely. This being so, when video signals are sequentially being written into an internal memory of the video recording device in accordance with the receive frequency and then being read from the internal memory and recorded onto the recording medium in accordance with the reference frequency, the amount of data flowing into the memory and the amount of data flowing from the memory become unbalanced, which often causes the memory to underflow or overflow.

To avoid this and enable seamless recording of data, the TBC operates to monitor the occurrence of underflow and overflow in the memory, and smooth out discrepancies between the video signal recording speed defined by the reference frequency which is fixed and the video signal input speed determined by the receive frequency which could vary, by repeating or skipping an output of a video signal from the internal memory in units of video frames. In so doing, the balance between the amount of incoming data and the amount of outgoing data in the memory is maintained.

To be more specific, when the receive frequency is higher than the reference frequency, the amount of incoming data exceeds the amount of outgoing data per unit time. In this case, the TBC skips a one-frame video signal and outputs the next one-frame video signal from the memory. On the other hand, when the receive frequency is lower than the reference frequency, the amount of incoming data falls short of the amount of outgoing data per unit time. In this case, the TBC outputs a one-frame video signal which was once outputted, again.

FIG. 1 shows how the TBC repeats or skips an output of a one-frame video signal.

In the figure, each large box represents a one-frame video signal which includes video information for video display and character information for character display.

The video information is designated by an alphabet that identifies the video signal, to indicate the flow of the video signal being written into or read from the memory.

The character information (explained later) is designated by alphabets that show characters contained in two types of character information included in the video signal. The uppercase alphabetic characters and the lowercase alphabetic characters respectively correspond to the two types of character information.

In each video signal shown in the middle of the figure, the alphabet given above the forward slash mark "/" indicates data which is read from the memory in the case where the receive frequency is higher than the reference frequency ($t_1<t_0$, $t_0=1/$(reference frequency)), whereas the alphabet given under "/" indicates data which is read from the memory in the case where the receive frequency is lower than the reference frequency ($t_2>t_0$).

In the figure, the direction from left to right represents time, with the reference line of each frame with respect to time is indicated by the left side line.

The operation of the TBC is explained below, with reference to this figure.

Unless the video signal receive frequency keeps perfect synchronization with the reference frequency, the amount of data flowing into the memory and the amount of data flowing from the memory will eventually become unbalanced, thereby causing an overflow or an underflow in the memory.

To prevent a memory overflow (in the case of $t_1<t_0$), the TBC skips the reading of the one-frame video signal "D" (see $X_1$ in FIG. 1), and instead reads the next one-frame video signal "E" from the memory. To prevent a memory underflow (in the case of $t_2>t_0$), the TBC reads the one-frame video signal "A" twice from the memory (see $X_2$ in FIG. 1).

In recent years, a caption display technique called closed captioning has been developed to display a caption of actors' lines, narrations, and sound effects so that the hearing impaired can enjoy broadcast programs and videos. In the closed caption technique, character information for caption display is multiplexed on a video signal so as to display a caption in sync with a video.

Also, similar caption display techniques have been developed that display information other than closed captions, such as weather forecast information, time information, and stock price information, by multiplexing these information on a video signal. Nowadays these techniques are put into actual use as well as the closed captioning.

Consequently, a video signal which usually contains only video information comes to contain character information such as closed caption data, when these caption display techniques are employed.

Such character information is carried on line 21 in both fields of the video signal, i.e. the vertical interval which is not used for picture display.

To display such character information on a screen, a decoder for decoding the character information multiplexed on the video signal is needed. A viewer can decide whether to display the character information or not.

However, the aforementioned caption display techniques have the following problem.

Video information corresponding to one frame is visual information of approximately 29.97 msec. A dropout or overlap of such one-frame video information is unlikely to cause visual disturbances. However, the problem arises when the TBC skips or repeats recording of character information corresponding to one frame, in the same way as video information. Character information is made up of character codes such as ASCII (American Standard Code for Information Interchange) codes and special character codes. Suppose character information representative of the characters "A, B", "C, D", "E, F", "G, H", "I, J", . . . is sequentially inputted into the memory as closed-caption data, as shown in FIG. 1. Here, if the receive frequency is higher than the reference frequency, the character information is recorded in the order of "A, B", "C, D", "E, F", "I, J", . . . , where the character information "G, H" is skipped. If, on the other hand, the receive frequency is lower than the reference frequency, the character information is recorded in the order of "A, B", "A, B", "C, D", "E, F", . . . , where the character information "A, B" is recorded twice. Thus, when the TBC is used to record character information multiplexed on video signals, dropouts or overlaps of characters are likely to occur. Character information recorded in such a way will end up being unintelligible to a viewer.

SUMMARY OF THE INVENTION

In view of the above problem, the first object of the invention is to provide a video recording device that, when recording a video signal containing character information using a TBC, can record the character information as faithfully as possible.

The second object of the invention is to provide a video recording method that realizes the faithful recording of the character information.

The third object of the invention is to provide a video rate adjusting device that outputs a video signal for enabling the faithful recording of the character information, the video rate adjusting device having the construction of the video recording device without a recording medium.

The first object can be fulfilled by a video recording device for recording a plurality of sets of video information that include a plurality of sets of character information, into a recording medium, including: a receiving unit operable to sequentially receive the plurality of sets of video information at a receive frequency which may vary; an extracting unit operable to sequentially extract the plurality of sets of character information from the received plurality of sets of video information; a video outputting unit operable to output the received plurality of sets of video information one at a time at a fixed output frequency which does not depend on the receive frequency, wherein when there is a frequency discrepancy between the output frequency and the receive frequency, the video outputting unit (1) skips a set of video information or (2) outputs a set of video information which was once outputted, again; a character outputting unit operable to output the extracted plurality of sets of character information one at a time at the output frequency, in the extracted order; a recording unit operable to record the outputted plurality of sets of video information and the outputted plurality of sets of character information in combination, into the recording medium in the outputted order; and an abandoning unit operable to, whenever a predetermined condition is met, (a) judge whether a value included in a set of character information extracted by the extracting unit is null, (b) abandon the set of character information whose value is judged as being null, and (c) instruct the character outputting unit to skip the abandoned set of character information and instead output a set of character information immediately following the abandoned set of character information.

With this construction, when the predetermined condition is present which indicates a danger of a buffering overflow, the set of character information which is judged as being null is abandoned and instead the next set of character information is outputted from the character outputting unit. As a result, a buffering overflow is avoided.

Here, the video recording device may further include: a buffer operable to temporarily store data, in which the plurality of sets of character information extracted by the extracting unit are sequentially inputted; and a data amount detecting unit operable to detect an amount of data currently stored in the buffer, wherein the predetermined condition is that the amount of data currently stored in the buffer is no smaller than a first threshold value, the character outputting unit retrieves a set of character information which has been stored for a longest time in the buffer, and outputs the retrieved set of character information, and when the predetermined condition is met, the retrieved set of character information is subjected to the judgement by the abandoning unit, before being outputted by the character outputting unit.

With this construction, when the amount of data stored in the buffer is equal to or larger than the first threshold value, the set of character information which is judged as being null is abandoned, thereby keeping the buffer from overflowing.

Here, the video recording device may further include a null information generating unit operable to generate a set of null information whose value is null, wherein if the amount of data currently stored in the buffer is below a second threshold value, the character outputting unit outputs the set of null information generated by the null information generating unit, as a set of character information.

With this construction, when the amount of data stored in the buffer is smaller than the second threshold value, the set of information that is null is generated and outputted from the character outputting unit, which enables seamless output of the plurality of sets of character information.

Here, the recording medium may be a DVD, wherein at least one of the plurality of sets of video information received by the receiving unit includes no set of character information, each of the received plurality of sets of video information includes inclusion information showing whether the set of video information includes a set of character information or not, and the recording unit (a) attaches a flag based on DVD recording standards which shows the inclusion of a set of character information, to each of the plurality of sets of video information outputted from the video outputting unit, regardless of whether the inclusion information of each of the plurality of sets of video information shows the inclusion or non-inclusion of a set of character information, and (b) records the combination of the outputted plurality of sets of video information and the outputted plurality of sets of character information, into the recording medium as a single VOB (Video Object).

With this construction, the flag showing the presence of a set of character information is attached to each of the plurality of sets of video information which are recorded as a single VOB, irrespective of whether each of the plurality of sets of video information actually includes a set of character information or not. In so doing, the DVD recording standards are complied with.

Here, the flag may be line 21 switch based on the DVD recording standards.

With this construction, line 21 switch is held ON to show the presence of a set of character information throughout the plurality of sets of video information which are recorded as a single VOB, irrespective of whether each of the plurality of sets of video information actually includes a set of character information or not. In so doing, the DVD recording standards are complied with.

Here, a value included in at least one of the plurality of sets of character information extracted by the extracting unit may be a character code used for closed captioning.

With this construction, when the predetermined condition is present which indicates a danger of a buffering overflow, closed caption data which is null is abandoned, with it being possible to avoid a buffering overflow without obstructing a faithful character display in reproduction.

Here, the recording medium may be a DVD, wherein at least one of the plurality of sets of video information received by the receiving unit includes no set of character information, each of the received plurality of sets of video information includes inclusion information showing whether the set of video information includes a set of character information or not, and the recording unit (a) attaches a flag based on DVD recording standards which shows the inclusion of a set of character information, to each outputted set of video information whose inclusion information shows the inclusion of a set of character information, (b) attaches a flag based on the DVD recording standards which shows the non-inclusion of a set of character information, to each outputted set of video information whose inclusion information shows the non-inclusion of a set of character information, and (c) records the combination of the outputted plurality of sets of video information and the outputted plurality of sets of character information into the recording medium as separate VOBs, the VOBs being separated from each other whenever the flag changes.

With this construction, when the state of the flag that shows the presence or absence of a set of character information changes from one video information string to the next video information string, the two video information strings are recorded as separate VOBs, with it being possible to comply with the DVD recording standards.

Here, the flag may be line 21 switch based on the DVD recording standards.

With this construction, when line 21 switch changes from one video information string to the next video information string, the two video information strings are recorded as separate VOBs, with it being possible to comply with the DVD recording standards.

Here, the recording medium may be a DVD, wherein at least one of the plurality of sets of video information received by the receiving unit includes no set of character information, each of the received plurality of sets of video information includes inclusion information showing whether the set of video information includes a set of character information or not, and the recording unit (a) attaches, when inclusion information of a set of video information outputted first among the plurality of sets of video information shows the inclusion of a set of character information, a flag based on DVD recording standards which shows the inclusion of a set of character information, to each of the plurality of sets of video information outputted from the video outputting unit, regardless of whether inclusion information of each of the plurality of sets of video information other than the first outputted set of video information shows the inclusion or non-inclusion of a set of character information, (b) attaches, when the inclusion information of the first outputted set of video information shows the non-inclusion of a set of character information, a flag based on the DVD recording standards which shows the non-inclusion of a set of character information, to each of the outputted plurality of sets of video information, regardless of whether the inclusion information of each of the plurality of sets of video information other than the first outputted set of video information shows the inclusion or non-inclusion of a set of character information, and (c) records the combination of the outputted plurality of sets of video information and the outputted plurality of sets of character information, into the recording medium as a single VOB.

With this construction, the inclusion information of the set of video information at the beginning of the plurality of sets of video information determines the state of the flag throughout the plurality of sets of video information which are recorded as a single VOB, so that the DVD recording standards are complied with.

Here, the flag may be line 21 switch based on the DVD recording standards.

With this construction, the inclusion information of the set of video information at the beginning of the plurality of sets of video information determines the state of line 21 switch throughout the plurality of sets of video information which are recorded as a single VOB, so that the DVD recording standards are complied with.

Here, the plurality of sets of character information extracted by the extracting unit may form packet data that contains a packet header, wherein the video recording device further includes a judging unit operable to judge whether a value included in the set of character information retrieved from the buffer shows the start of the packet header, wherein if the amount of data currently stored in the buffer exceeds a third threshold value which is larger than the first threshold value, and if the judging unit judges that the value in the retrieved set of character information shows the start of the packet header, the abandoning unit (a) abandons a predetermined number of consecutive sets of character information starting from the set of character information whose value is judged as showing the start of the packet header, and (b) instructs the character outputting unit to skip the abandoned sets of character information, and instead output a set of character information immediately following the abandoned sets of character information.

With this construction, when the amount of data stored in the buffer exceeds the third threshold value, the predetermined number of sets of character information starting from the set of character information which corresponds to the start of the packet are abandoned, with it being possible to avoid an overflow of the buffer.

Here, each of the plurality of sets of character information extracted by the extracting unit may include error information which shows whether an error is present in a value included in the set of character information or not, wherein the video recording device further includes an error judging unit operable to refer to error information in the set of character information extracted by the extracting unit, and judge whether the error information shows the presence or absence of an error, wherein when the error information shows the presence of an error, the character outputting unit changes the error information to show the absence of an error, and outputs the set of character information With this construction, even when the error information in the set of character information shows the presence of an error, the error information is changed to show the absence of an error before the set of character information is outputted from the character outputting unit, so that the DVD recording standards are complied with.

Here, when the error information shows the presence of an error, the character outputting unit may change the error information to show the absence of an error, further change a value included in the set of character information to a predetermined value, and output the set of character information.

With this construction, even when the error information in the set of character information shows the presence of an error, the value in the set of character information is changed to the predetermined value and the error information is changed to show the absence of an error, before the set of character information is outputted from the character outputting unit. In so doing, the DVD recording standards are complied with.

Here, the predetermined value may be a character code which represents a box filled in with black.

With this construction, even when the error information in the set of character information shows the presence of an error, the value in the set of character information is changed to a character code representative of a box filled in with black, and the error information is changed to show the absence of an error, before the set of character information is outputted from the character outputting unit. In so doing, the DVD recording standards are complied with.

Here, the error information may be a parity bit, wherein the character outputting unit changes a parity bit in the set of character information whose value is judged as having an error, to show a correct parity, and outputs the set of character information.

With this construction, even when the parity bit in the set of character information shows the presence of an error, the parity bit is corrected before the set of character information is outputted from the character outputting unit.

Here, when the error information shows the presence of an error, the character outputting unit may change the error information to show the absence of an error, further change a value included in the set of character information to a null value, and output the set of character information.

With this construction, even when the error information in the set of character information shows the presence of an error, the value in the set of character information is changed to a null value and the error information is changed to show the absence of an error, before the set of character information is outputted from the character outputting unit. In so doing, the DVD recording standards are complied with.

Here, the video recording device may further include: a word storing unit storing a plurality of different words; and a character acquiring unit operable to (a) obtain a character string which seems to form a word, based on characters represented by values included in sets of character information preceding and following the set of character information whose value is judged as having an error, (b) search the word storing unit for a word corresponding to the obtained character string, to find a character which seems to be a correct character for a character represented by the value in the set of character information, and (c) generate a character code representative of the found character, wherein the character outputting unit changes the value in the set of character information to the generated character code, and outputs the set of character information.

With this construction, even when the error information in the set of character information shows the presence of an error, the value in the set of character information is replaced with a character code representative of a character which seems to be correct, and the error information is changed to show the absence of an error, before the set of character information is outputted from the character outputting unit. In so doing, the DVD recording standards are complied with.

Here, the character acquiring unit may obtain the character string, on an assumption that the character string ends right before a character other than an alphabet.

With this construction, the word corresponding to the character string which contains the wrong character is extracted, so as to find the correct character.

The second object can be fulfilled by a video recording method for recording a plurality of sets of video information that include a plurality of sets of character information, into a recording medium, including: a receiving step for sequentially receiving the plurality of sets of video information at a receive frequency which may vary; an extracting step for sequentially extracting the plurality of sets of character information from the received plurality of sets of video information; a video outputting step for outputting the received plurality of sets of video information one at a time at a fixed output frequency which does not depend on the receive frequency, wherein when there is a frequency discrepancy between the output frequency and the receive frequency, the video outputting step (1) skips a set of video information or (2) outputs a set of video information which was once outputted, again; a character outputting step for outputting the extracted plurality of sets of character information one at a time at the output frequency, in the extracted order; a recording step for recording the outputted plurality of sets of video information and the outputted plurality of sets of character information in combination, into the recording medium in the outputted order; and an abandoning step for, whenever a predetermined condition is met, (a) judging whether a value included in a set of character information extracted by the extracting step is null, (b) abandoning the set of character information whose value is judged as being null, and (c) instructing the character outputting step to skip the abandoned set of character information and instead output a set of character information immediately following the abandoned set of character information.

With this construction, when the predetermined condition is present which indicates a danger of a buffering overflow, the set of character information which is judged as being null is abandoned and instead the next set of character information is outputted from the character outputting unit, so that a buffering overflow is avoided.

The third object can be fulfilled by a video rate adjusting device, including: an input accepting unit operable to sequentially accept a plurality of videos and a plurality of sets of character information; a video outputting unit operable to skip part of the accepted plurality of videos, and output the remaining videos at a predetermined speed in the accepted order; a character judging unit operable to judge, for each of the accepted plurality of sets of character information, whether a value included in the set of character information is null; and a character outputting unit operable to output, in a one-to-one correspondence with the videos outputted by the video outputting unit, sets of character information other than the sets of character information whose values are judged as being null, at the predetermined speed in the accepted order.

BRIEF DESCRIPTION OF THE DRAWINGS

These and other objects, advantages and features of the invention will become apparent from the following description thereof taken in conjunction with the accompanying drawings that illustrate a specific embodiment of the invention. In the drawings:

FIG. 12 shows a procedure in which recording is performed with line 21 switch specified by DVD recording standards being held ON;

FIG. 17 illustrates an example application of the video recording device of the invention; and FIG. 18 is a functional block diagram showing a construction of a character information recording controlling unit wherein normal control, anti-underflow control, anti-overflow control, header abandonment, and parity correction are carried out before character information is stored in a memory.

DESCRIPTION OF THE PREFERRED EMBODIMENT(S)

The following is a description of a video recording device according to an embodiment of the invention, with reference to the figures.

Figure 2:
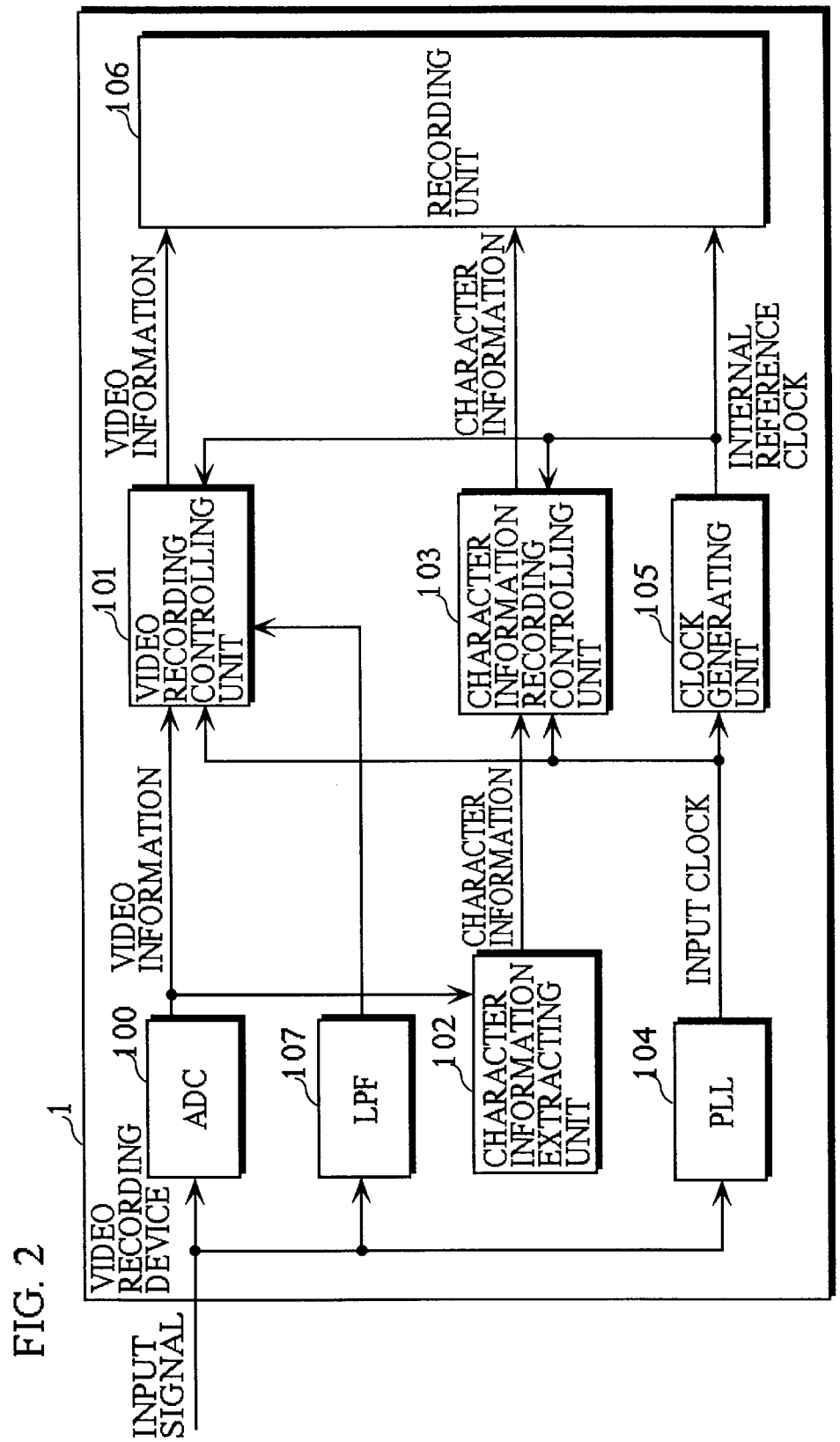
FIG. 2 is a functional block diagram of a video recording device according to an embodiment of the invention.

FIG. 2 is a functional block diagram of a video recording device 1 according to the embodiment of the invention.

The video recording device 1 sequentially receives analog video signals each of which carries video information for one frame of picture, character information such as closed caption data, and character information other than closed caption such as weather forecast data, and continuously records the video information and the character information in accordance with an internal reference clock unique to the video recording device 1, without depending on an input clock generated from the video signals. The video recording device 1 is roughly made up of an ADC (Analog to Digital Convertor) 100, a video recording controlling unit 101 for controlling the recording of the video information, a character information extracting unit 102 for extracting the character information from the video signal, a character information recording controlling unit 103 for controlling the recording of the character information, a PLL (Phase Locked Loop) 104, a clock generating unit 105 for generating the internal reference clock of a fixed frequency, a recording unit 106 for storing the video information and the character information, and an LPF (LowPass Filter) 107.

The ADC 100 receives an NTSC (National Television Standards Committee) analog video signal of one frame in which video information, character information such as a closed caption, and a synchronous signal are multiplexed, from a TV broadcast station or the like via a receiver. The ADC 100 then converts the received analog video signal to a digital video signal, and outputs it to the video recording controlling unit 101 and the character information extracting unit 102.

The character information referred to here is carried on line 21, i.e. the vertical interval, of both fields of the video signal.

The frame is composed of a first field and a second field which each have line 21. Line 21 of the first field and line 21 of the second field respectively have a 16-bit first area and a 16-bit second area, each for storing character information for two characters.

Figure 3:
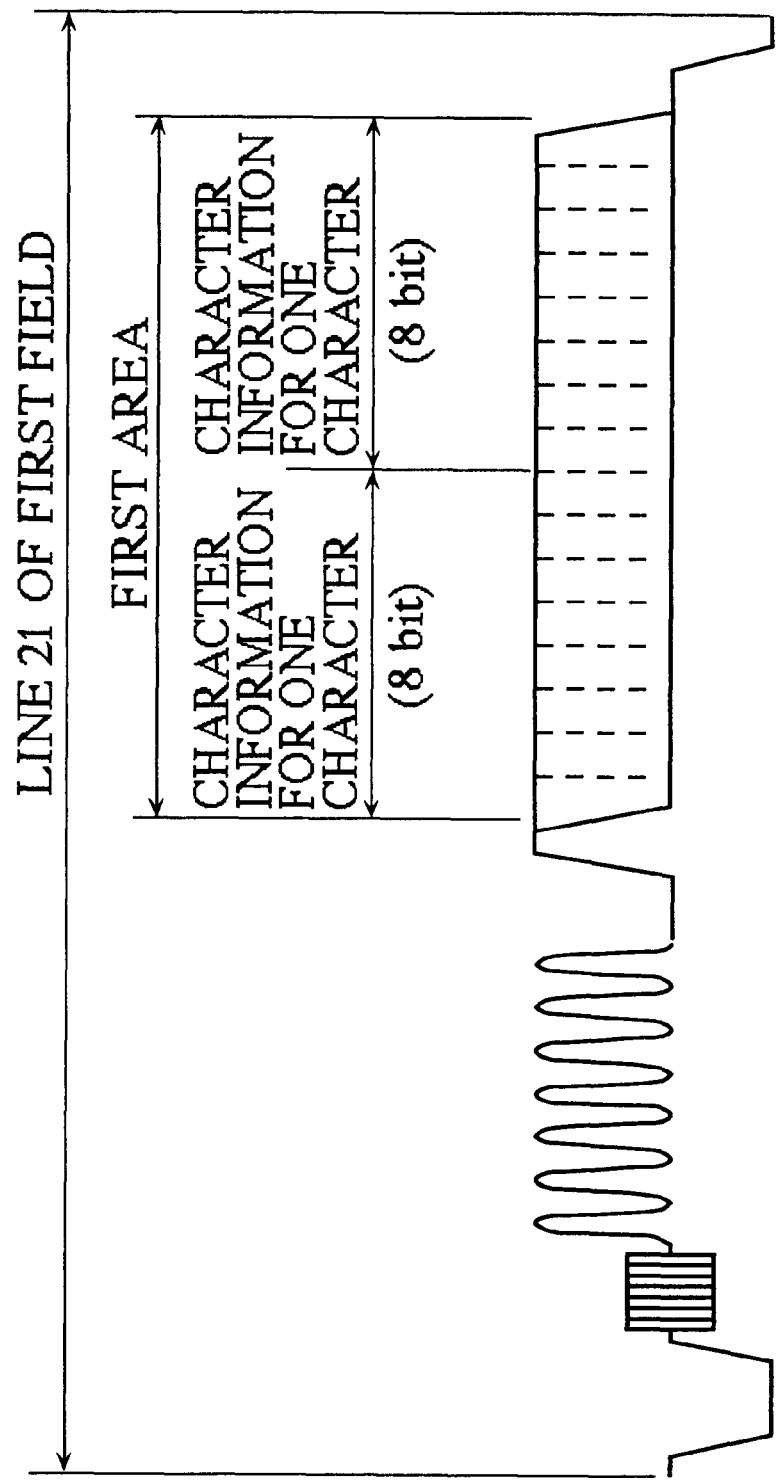
FIG. 3 shows a waveform of line 21 on which character information is contained.

FIG. 3 shows a waveform of line 21 of the first field which carries character information.

Character information carried in the first area (hereinafter, "first character information") is made up of two pairs of parity bits and character codes used exclusively for closed captioning. Meanwhile, character information carried in the second area (hereinafter, "second character information") is made up of two pairs of parity bits and character codes used for a caption other than closed captioning such as a caption of weather forecast, or made up of two pairs of parity bits and control character codes designed for a "V-chip" that prohibits a person under a certain age from viewing broadcast programs with a high content of violence.

A parity bit mentioned here is used to check whether its accompanying character code is accurate or not.

The first character information and the second character information each form part of a data transfer packet which is used in a system that displays character information on a screen.

Such a packet is made up of a header, a payload, and a footer.

Figure 4:
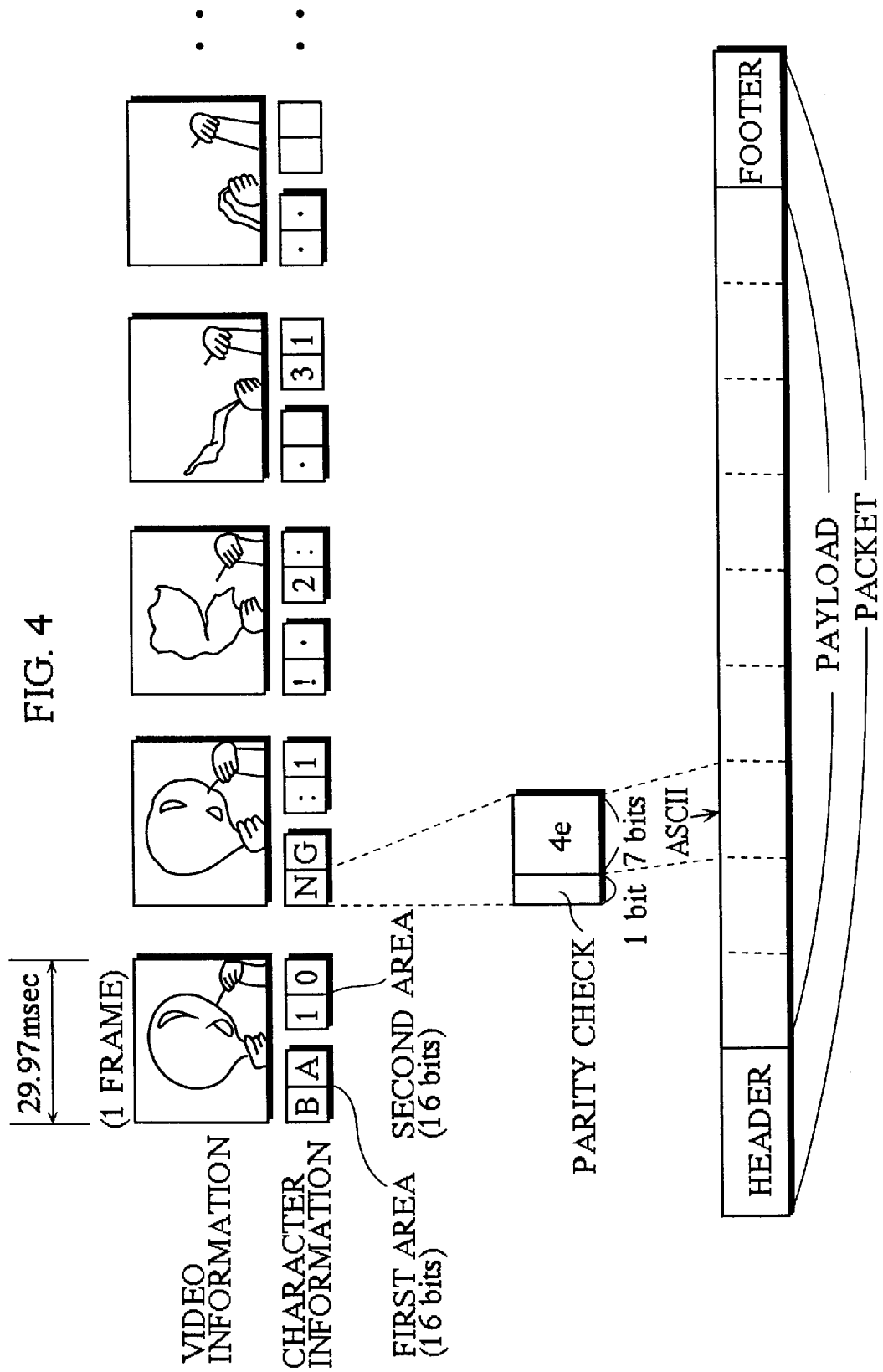
FIG. 4 shows a structure of one-frame video signals which each include first and second character information, a structure of character information included in the first character information which is made up of a parity bit and a character code, and a structure of a packet which is made up of a string of character codes.

FIG. 4 shows the relation between video information and first and second character information on a frame-by-frame basis, and the relation between a packet and a character code included in the first character information.

The figure illustrates an example in which character information is multiplexed with video information of a video of several frames where a balloon is being punctured. The character information is composed of first character information for closed captioning which is used to display a character string "BANG! . . . " together with the video of the balloon being punctured, and second character information other than closed captioning which is used to display time information "10:12:31".

For instance, first character information showing "N" of the character string "BANG! . . . " to be displayed in closed captioning is contained in the first area of the video signal of the second frame, together with first character information showing "G".

Here, the first character information showing "N" is made up of 8 bits, in which one bit is a parity bit and the other 7 bits make up an ASCII character code "4e" representative of the character "N".

Thus, the first area of each one-frame video signal stores first character information for displaying two characters in closed captioning. In this first area, an area assigned for each of the two characters is made up of a 1-bit area used for parity checking and a 7-bit area used for an ASCII or special character code which represents the character.

Concatenating 7-bit ASCII codes stored in first areas of consecutive one-frame video signals forms such a packet as shown in FIG. 4, wherein the character code representative of "N" is included in the payload of the packet.

Likewise, the second area of each one-frame video signal has a capacity of storing second character information for two characters. In this second area, an area assigned for each of the two characters is made up of a 1-bit area used for parity checking and a 7-bit area used for an ASCII or special character code which represents the character. Note here that the second area does not necessarily store character codes for character display, but may instead store control character codes such as those designed for a V-chip.

The PLL 104 generates an input clock made up of a string of periodic pulses, based on the synchronous signal in the analog video signal, and outputs it to the video recording controlling unit 101, the character information recording controlling unit 103, and the clock generating unit 105.

The clock generating unit 105 receives the input clock from the PLL 104. If the input clock matches the fixed frequency of the internal reference clock, the clock generating unit 105 generates the internal reference clock in sync with the phase of the input clock, and outputs it to the video recording controlling unit 101, the character information recording controlling unit 103, and the recording unit 106.

If the input clock does not match the frequency of the internal reference clock, the clock generating unit 105 generates the internal reference clock without any jitter, asynchronous to the phase of the input clock. The clock generating unit 105 then outputs the internal reference clock to the video recording controlling unit 101, the character information recording controlling unit 103, and the recording unit 106.

The video recording controlling unit 101 includes a memory for temporarily storing video information, and a plurality of control circuits for controlling the timing of inputting/outputting data and the selection of data to be inputted/outputted. The video recording controlling unit 101 receives the one-frame video information from the ADC 100, and writes it into the memory in sync with the input clock outputted from the PLL 104.

While determining which video information should be read and when the video information should be read, the video recording controlling unit 101 reads video information from the memory in units of frames in sync with the internal reference clock outputted from the clock generating unit 105, and outputs it to the recording unit 106.

The character information extracting unit 102 extracts the character information multiplexed on the one-frame digital video signal outputted from the ADC 100, in other words, first character information and second character information stored in line 21 of the first and second fields of the video signal. The character information extracting unit 102 then outputs the extracted character information to the character information recording controlling unit 103.

The LPF 107 separates low frequency components such as a vertical synchronous signal from the input video signal, and outputs it to the video recording controlling unit 101. This signal is used in the video recording controlling unit 101 to judge whether information at the beginning of one-frame video information is received or not.

The character information recording controlling unit 103 includes a CPU and a storage medium such as a DRAM. The character information recording controlling unit 103 receives the character information from the character information extracting unit 102, and writes it into the storage medium in sync with the input clock outputted from the PLL 104. The character information recording controlling unit 103 also reads character information from the storage medium, and continuously outputs it to the recording unit 106 in sync with the internal reference clock outputted from the clock generating unit 105.

Figure 5:
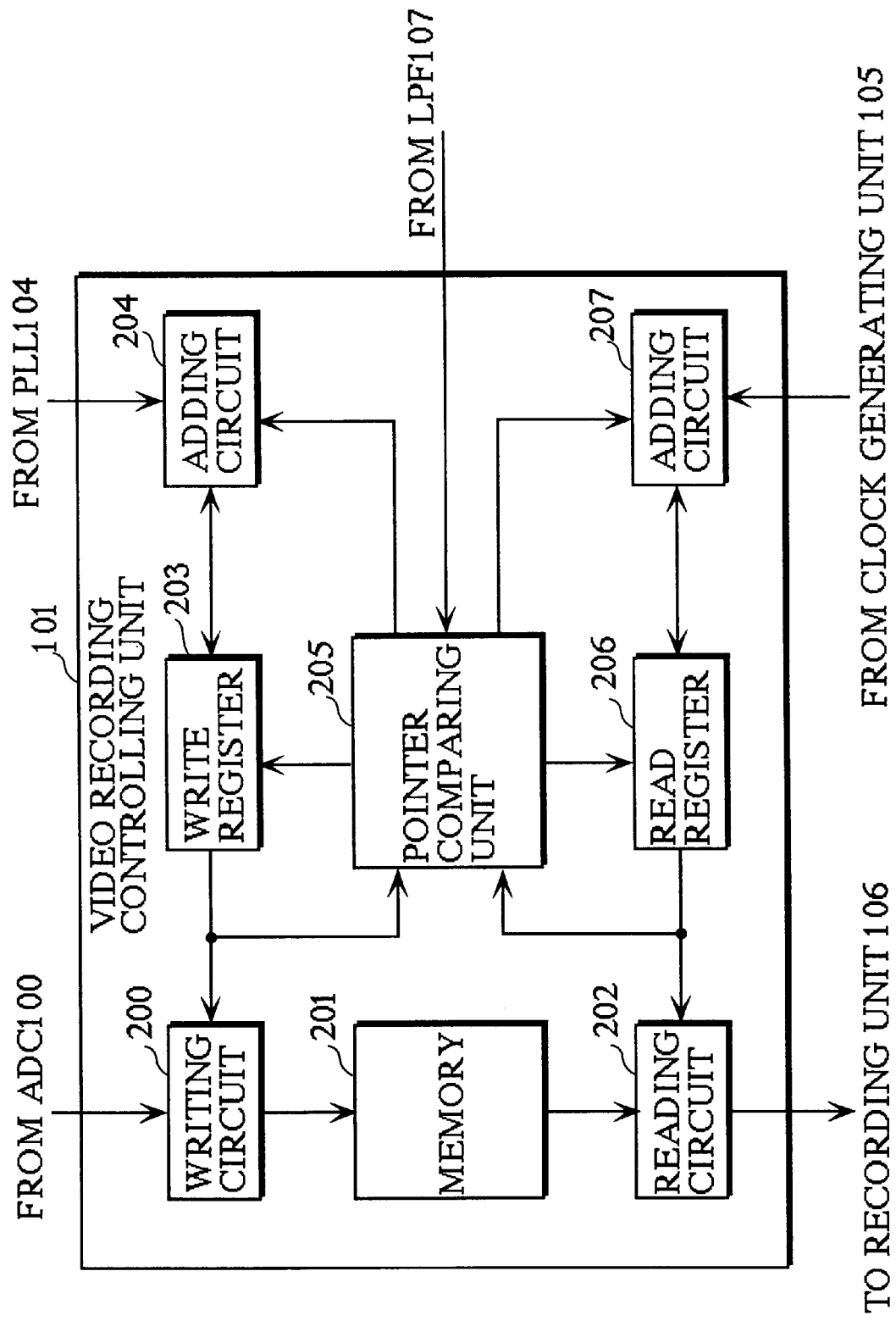
FIG. 5 is a functional block diagram of a video recording controlling unit shown in FIG. 2.

FIG. 5 is a functional block diagram of the video recording controlling unit 101.

The video recording controlling unit 101 is roughly made up of a writing circuit 200, a memory 201, a reading circuit 202, a write register 203, adding circuits 204 and 207, a pointer comparing unit 205, and a read register 206, as shown in the figure.

The writing circuit 200 writes video information received from the ADC 100, into an address of the memory 201 specified by the write register 203.

The memory 201 is an SDRAM or the like, which has a capacity of about 16MB for storing two frames of video information.

Here, one frame of video information is information for displaying a static image of one frame for 29.97 msec.

The reading circuit 202 reads video information from an address of the memory 201 specified by the read register 206, and outputs it to the recording unit 106.

The write register 203 is a register circuit for storing a write address. Each time the write address is renewed, the write register 203 outputs the renewed write address to the writing circuit 200 and the pointer comparing unit 205.

The adding circuit 204 adds 1 to the value stored in the write register 203 in sync with the input clock outputted form the PLL 104, to renew the write address.

The read register 206 is a register circuit for storing a read address. When instructed by the pointer comparing unit 205, the read register 206 outputs the read address to the reading circuit 202 and the pointer comparing unit 205.

The adding circuit 207 adds 1 to the value stored in the read register 206 in sync with the internal reference clock outputted from the clock generating unit 105, to renew the read address.

The pointer comparing unit 205 compares the value stored in the write register 203 and the value stored in the read register 206, and changes the value in the read register 206 to control the write and read addresses for the memory 201. In other words, the pointer comparing unit 205 controls the read address so as to use the memory 201 as a ring buffer.

To be more specific, the pointer comparing unit 205 operates in the following way. When the video recording device 1 is powered on, data in the memory 201 is cleared. After this, the write address in the write register 203 is incremented, and data is written into the memory 201 at each incremented address.

The pointer comparing unit 205 monitors, based on the video signal received from the LPF 107, whether one-frame video information has been written into the memory 201 for the first time after the power-on of the video recording device 1. On judging that the first one-frame video information has been written in the memory 201, the pointer comparing unit 205 starts incrementing the read address in the read register 206. At this point in time, half of the memory 201 is filled with data, and the difference between the write address value in the write register 203 and the read address value in the read register 206 is ½ of the full address value (maximum address value) of the memory 201.

Here, if the input clock frequency is higher than the internal reference clock frequency, the amount of data written in the memory 201 exceeds the amount of data read from the memory 201 in a unit time. This being so, the difference between the write address value in the write register 203 and the read address value in the read register 206 gradually increases with time.

Should this condition continue, eventually data that has not yet been read from the memory 201 is overwritten with another data, which results in mixed video information of two frames of images. This causes improper video recording.

To avoid this, the pointer comparing unit 205 monitors, based on the video signal received from the LPF 107, whether data at the beginning of one-frame video information is inputted. If the input of such data is detected, the pointer comparing unit 205 checks whether the difference between the write address value in the write register 203 and the read address value in the read register 206 exceeds 70% of the full address value of the memory 201. If the difference exceeds 70% of the full address value, later when the read address in the read register 206 reaches, as a result of increments, the write address value which was judged as having a difference exceeding 70% of the full address value, the pointer comparing unit 205 adds a value equivalent to half of the full address value, to the read address in the read register 206. As a result, one-frame video information in the memory 201 which was specified by the read address right before the addition of half of the full address value to the read address is not read but is abandoned (this process is hereafter called "skip").

Figure 1:
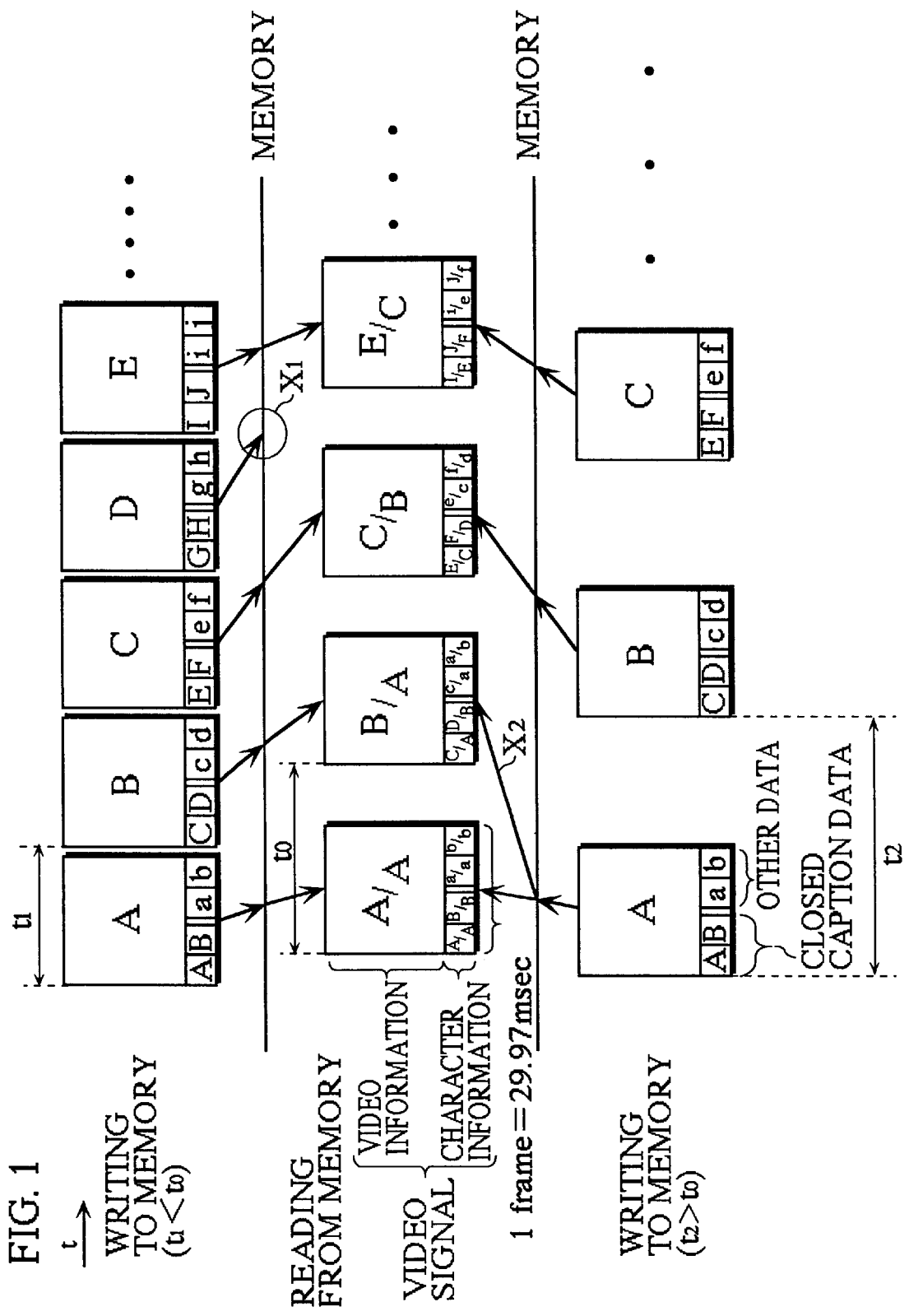
FIG. 1 shows how a TBC repeats or skips recordings of video signals in units of video frames.

In FIG. 1, for instance, the video information "D" in the case of $t_1<t_0$ is not read but is abandoned, as indicated by $X_1$.

Such a skip is repeated more or less at regular time intervals, unless the condition of the input clock frequency exceeding the internal reference clock frequency is resolved. Here, since skipped video information is information for displaying a static image of one frame for 29.97 msec, a dropout of such one-frame video information will not cause visual disturbances.

Meanwhile, if the input clock frequency is lower than the internal reference clock frequency, the amount of data written into the memory 201 falls short of the amount of data read from the memory 201 in a unit time. This being so, the difference between the write address value in the write register 203 and the read address value in the read register 207 gradually decreases with time. Should such a condition continue, eventually all data is read from the memory 201, which causes an underflow of the memory 201.

To avoid this, on judging from the video signal received from the LPF 107 that data at the beginning of one-frame video information is inputted, the pointer comparing unit 205 checks whether the difference between the write address value in the write register 203 and the read address value in the read register 206 is below 20% of the full address value of the memory 201. If the difference is below 20% of the full address value, later when the read address in the read register 206 reaches, as a result of increments, the write address value which was judged as having a difference below 20% of the full address value, the pointer comparing unit 205 subtracts a value equivalent to half of the full address value, from the read address in the read register 206. As a result, one-frame video information which was read right before the subtraction of half of the full address value from the read address is read from the memory 201 again (this process is hereafter called "repetition").

In FIG. 1, for instance, the video information "A" in the case of $t_2>t_0$, which has been already read, is read again, as indicated by $X_2$.

Such a repetition is repeated more or less at regular time intervals, unless the condition of the input clock frequency falling short of the internal reference clock frequency is resolved. Here, since twice-read video information is information for displaying a static image of one frame for 29.97 msec, an overlap of such one-frame video information will not cause visual disturbances.

Figure 6:
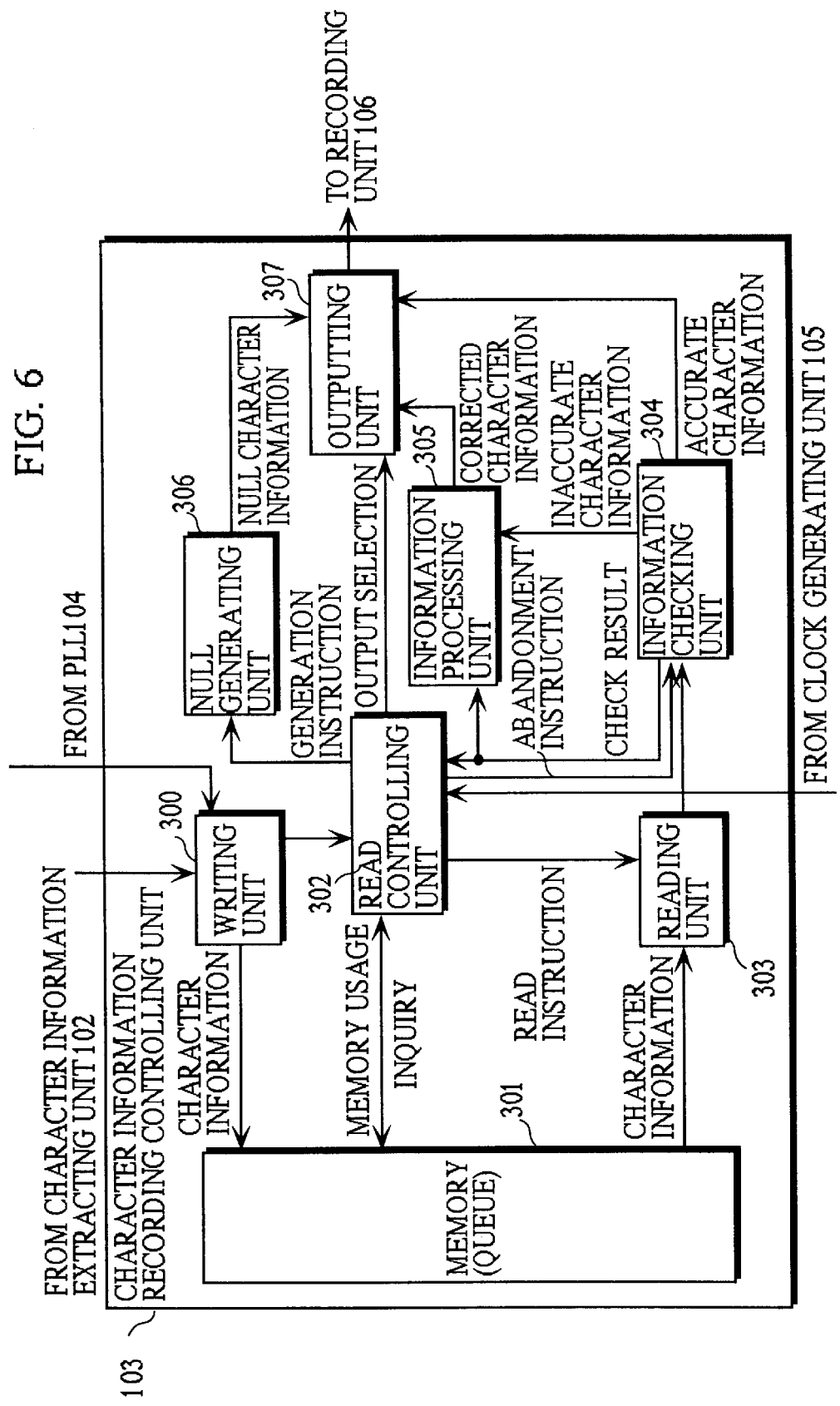
FIG. 6 is a functional block diagram of a character information recording controlling unit shown in FIG. 2.

FIG. 6 is a functional block diagram of the character information recording controlling unit 103.

The character information recording controlling unit 103 is mainly made up of a writing unit 300, a memory 301, a read controlling unit 302, a reading unit 303, an information checking unit 304, an information processing unit 305, a NULL generating unit 306, and an outputting unit 307, as shown in the figure.

The writing unit 300 receives character information from the character information extracting unit 102 and writes it into the memory 301, at the timing of a pulse input of the input clock outputted from the PLL 104. The writing unit 300 then informs the read controlling unit 302 of the writing of the character information.

The memory 301 is a storage medium such as a DRAM for temporarily storing data using a queue by FIFO (First-In First-Out). The memory 301 has a capacity of 40 bytes for storing ten frames of character information. The memory 301 is made up of a first memory area for temporarily storing first character information up to ten frames, and a second memory area for temporarily storing second character information up to ten frames.

When inquired by the read controlling unit 302, the memory 301 outputs memory usage information on the amount of memory currently used in the first memory area and memory usage information on the amount of memory currently used in the second memory area, to the read controlling unit 302.

The reading unit 303 reads from the memory 301 first character information of one frame and second character information of one frame which are each 16 bits long, when instructed by the read controlling unit 302. The reading unit 303 then outputs the read character information to the information checking unit 304.

The read controlling unit 302 includes a CPU and a storage medium such as a RAM or a ROM, and exercises control so that character information is read from the memory 301 and continuously recorded to the recording unit 106.

To be more specific, the read controlling unit 302 acquires the memory usage information for each of the first and second memory areas from the memory 301, at the timing of a pulse input of the internal reference clock outputted from the clock generating unit 105. For each of the first and second memory areas, the read controlling unit 302 checks whether the memory usage of the memory area is equal to the amount of character information corresponding to one frame (i.e. 16 bits, which is hereafter called "reference data amount"). If the memory usage of the memory area is equal to the reference data amount, the read controlling unit 302 exercises normal control (described later). If the memory usage is below the reference data amount, the read controlling unit 302 exercises anti-underflow control (described later). If the memory usage is above the reference data amount, the read controlling unit 302 exercises anti-overflow control (described later).

The normal control, the anti-underflow control, and the anti-overflow control which are performed on both first character information and second character information are collectively called "TBC character information control" in this specification.

The TBC character information control is explained in detail below.

The read controlling unit 302 inquires of the memory 301 about memory usage of one of the first and second memory areas. If the memory usage is equal to the reference data amount, the read controlling unit 302 performs the normal control.

More specifically, the read controlling unit 302 inquires of the memory 301 about the memory usage of the memory area, at the timing of an input pulse outputted from the clock generating unit 105.

When the memory usage is equal to the reference data amount, the read controlling unit 302 instructs the reading unit 303 to read character information stored at the top of the queue in the memory area, from the memory 301. The read controlling unit 302 then instructs the outputting unit 307 to output, at the timing where 15 msec elapses after the input pulse, the character information which has been read by the reading unit 303 and passed through the information checking unit 304 to the outputting unit 307.

Meanwhile, if the memory usage is below the reference data amount, the read controlling unit 302 exercises the anti-underflow control. Suppose the memory usage of the first memory area is below the reference data amount. Then the read controlling unit 302 performs the anti-underflow control for first character information.

More specifically, the read controlling unit 302 inquires the memory 301 about the memory usage of the memory area, at the timing of an input pulse outputted from the clock generating unit 105. If the memory usage is below the reference data amount, the read controlling unit 302 instructs the NULL generating unit 306 to generate character information which is invalid in data processing, i.e. character information made up of null character codes. The read controlling unit 302 then instructs the outputting unit 307 to output, at the timing of 15 msec after the input pulse, the null character information generated by the NULL generating unit 306.

Figure 7:
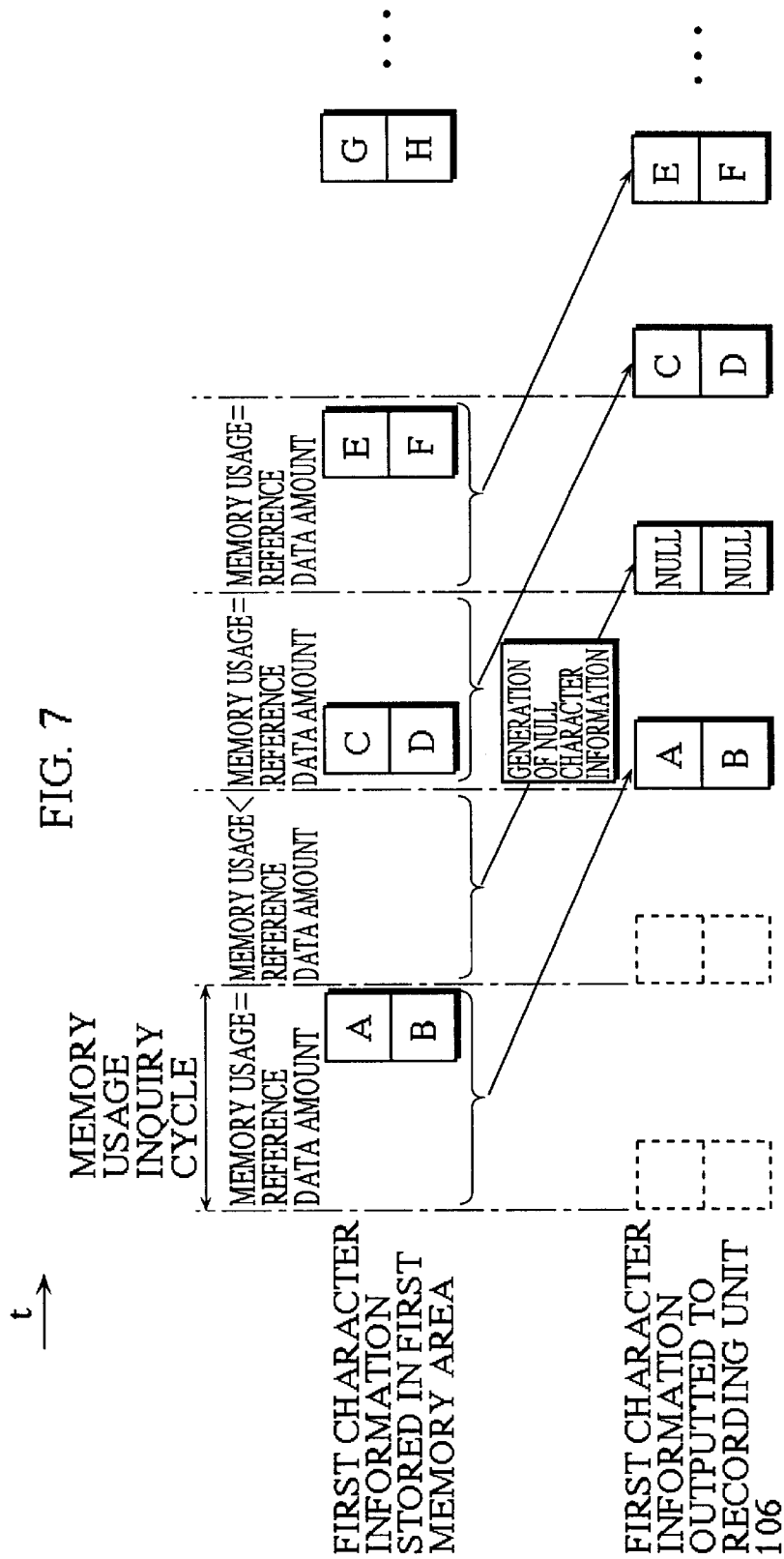
FIG. 7 shows procedures of normal control and anti-underflow control, taking first character information as an example.

FIG. 7 shows procedures of the normal control and the anti-underflow control, taking first character information as an example.

The read controlling unit 302 inquires of the memory 301 about the memory usage of the first memory area, at the timing of an input pulse outputted from the clock generating unit 105. In the first inquiry cycle in FIG. 7, the memory usage is equal to the reference data amount, so that the read controlling unit 302 performs the normal control. Here, the read controlling unit 302 instructs the reading unit 303 to read first character information showing the characters "A" and "B" from the memory 301, and instructs the outputting unit 307 to output the read first character information 15 msec after the input pulse.

In the second inquiry cycle, the memory usage is 0, which is below the reference data amount, because the next first character information showing the characters "C" and "D" has not yet been inputted in the first memory area of the memory 301.

Accordingly, the read controlling unit 302 performs the anti-underflow control. Here, the read controlling unit 302 instructs the NULL generating unit 306 to generate null character information for one frame, and instructs the outputting unit 307 to output the generated null character information 15 msec after an input pulse outputted from the clock generating unit 105 at the start of the second inquiry cycle.

In the subsequent third and fourth inquiry cycles, the memory usage is equal to the reference data amount, as the first character information showing "C" and "D" and the next first character information showing "E" and "F" are stored in the first memory area in the respective cycles. Accordingly, the read controlling unit 302 performs the normal control.

The above anti-underflow control is frequently employed when video signals do not contain character information.

On the other hand, the anti-overflow control is performed in the following manner.

If the read controlling unit 302 inquires of the memory 301 about the memory usage of the memory area and the response shows that the memory usage exceeds the reference data amount, the read controlling unit 302 exercises the anti-overflow control. Suppose the memory usage of the first memory area in the memory 301 exceeds the reference data amount. Then the read controlling unit 302 performs the anti-overflow control on first character information.

More specifically, the read controlling unit 302 inquires of the memory 301 about the memory usage of the memory area, at the timing of an input pulse outputted from the clock generating unit 105. If the memory usage of the memory area exceeds the reference data amount, the read controlling unit 302 instructs the reading unit 303 to read character information stored at the top of the queue in the memory area.

The reading unit 303 reads the character information from the memory 301, and outputs it to the information checking unit 304.

The information checking unit 304 checks whether character codes included in the received character information are null values. If the character codes are not null, the read controlling unit 302 instructs the outputting unit 307 to output the character information 15 msec after the input pulse.

Meanwhile, if the character codes are null, the read controlling unit 302 instructs the information checking unit 304 to abandon the character information, and immediately inquires of the memory 301 about the memory usage of the memory area. The read controlling unit 302 then performs the normal control or the anti-overflow control.

Here, the read controlling unit 302 instructs the outputting unit 307 to output not the character information which is judged as being null but the next character information which is stored in the queue in the memory area immediately following the null character information.

However, if the memory usage of the memory area before the reading of the next character information still exceeds the reference data amount, and if the next character information read from the queue is judged as including null character codes, the read controlling unit 302 instructs the outputting unit 307 to output character information stored in the queue immediately following the next character information.

Figure 8:
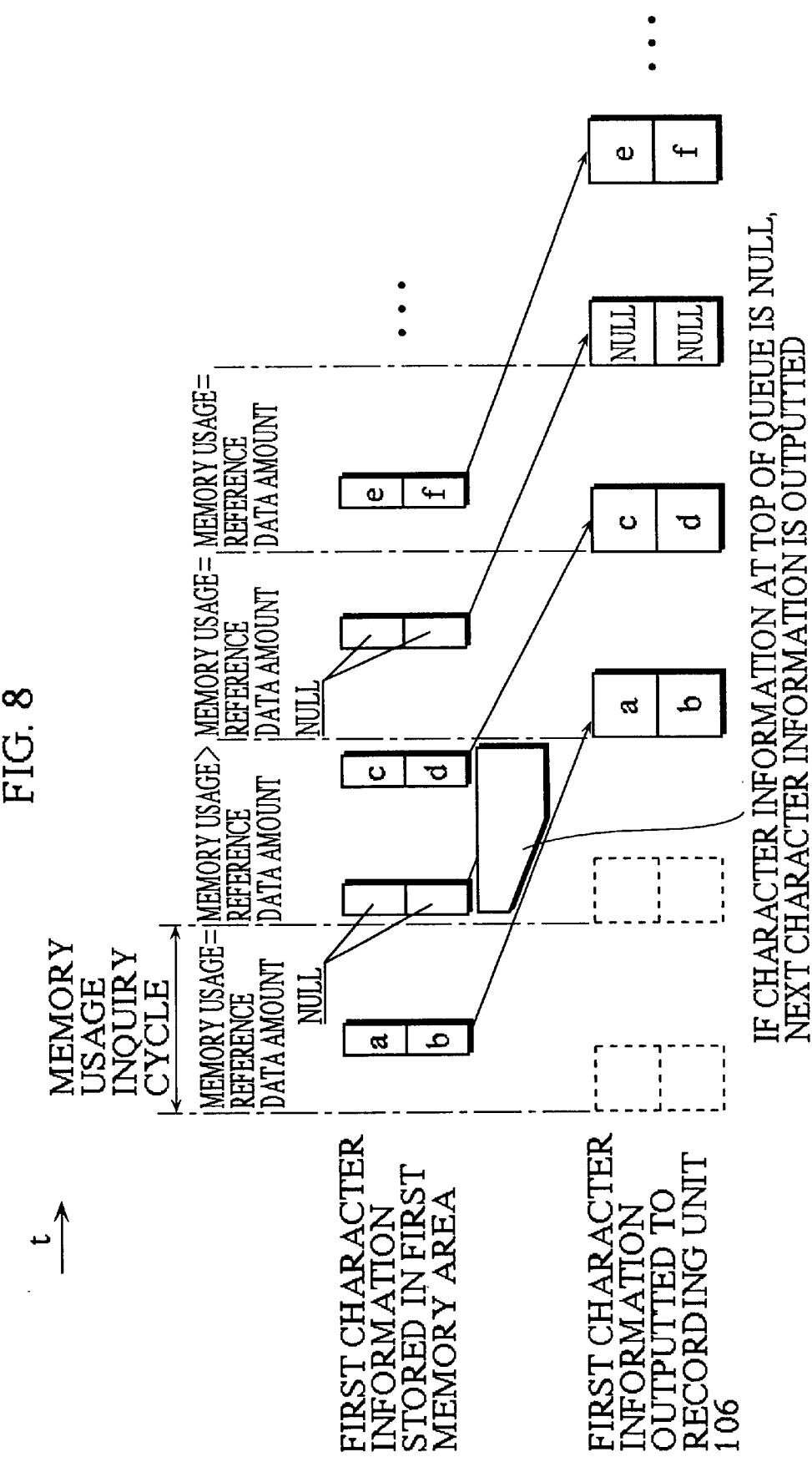
FIG. 8 shows a procedure of anti-overflow control, taking first character information as an example.

FIG. 8 shows a procedure of the anti-overflow control, taking first character information as an example.

The read controlling unit 302 inquires of the memory 301 about the memory usage of the first memory area, at the timing of an input pulse outputted from the clock generating unit 105. In the first inquiry cycle in FIG. 8, the memory usage is equal to the reference data amount, so that the read controlling unit 302 performs the normal control. Here, the read controlling unit 302 instructs the reading unit 303 to read first character information showing the characters "a" and "b" from the memory 301, and instructs the outputting unit 307 to output the read first character information 15 msec after the input pulse.

In the second inquiry cycle, the memory usage exceeds the reference data amount, so that the read controlling unit 302 performs the anti-overflow control.

Here, the read controlling unit 302 instructs the reading unit 303 to read first character information at the top of the queue in the first memory area. The reading unit 303 reads the first character information and outputs it to the information checking unit 304.

The information checking unit 304 judges that the received first character information has null character codes, and informs the read controlling unit 302 as such. The read controlling unit 302 instructs the information checking unit 304 to abandon the first character information, and immediately inquires of the memory 301 about the memory usage of the first memory area. At this point, the memory usage of the first memory area is equal to the reference data amount, so that the read controlling unit 302 performs the normal control. Here, the read controlling unit 302 instructs the reading unit 303 to read first character information showing the characters "c" and "d" from the first memory area, and instructs the outputting unit 307 to output the read first character information 15 msec after an input pulse outputted from the clock generating unit 105 at the start of the second inquiry cycle.

In the subsequent third and fourth inquiry cycles, the memory usage is equal to the reference data amount, as first character information showing "NULL" and "NULL" and first character information showing "e" and "f" are stored in the first memory area in the respective cycles. Hence the read controlling unit 302 exercises the normal control.

It should be noted here that even when character information which has null character codes is present in the memory 301, if the memory usage is equal to the reference data amount, that character information is not abandoned but is outputted to the outputting unit 307, under the normal control.

Though character information for one frame is made up of two sets of 8-bit character information, in most cases null character information is inputted in the memory 301 in a frame unit. Which is to say, when a set of 8-bit character information in one frame is null, in most cases the other set of 8-bit character information in the same frame is null, too.

Therefore, abandoning null character information under the anti-overflow control is done in units of 16 bits, i.e. in units of frames.

Here, suppose the memory usage of the memory area exceeds the reference data amount, and yet all character information queuing in the memory area is character information which is not null. In this case, even if the read controlling unit 302 repeatedly performs the above anti-overflow control, the memory usage of the memory area increases more and more, which results in an overflow. When this happens, part of character information in the memory area will be lost by overwriting.

To prevent this from happening, header abandonment is carried out to complement the anti-overflow control, in the following way.

Figure 9:
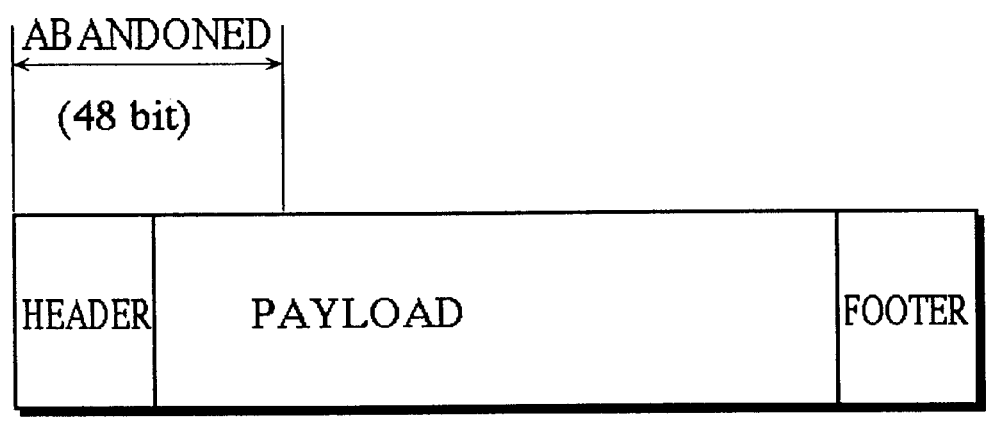
FIG. 9 shows a packet which is made up of a string of first character information for closed captioning.

FIG. 9 shows a packet which is formed from a string of first character information for closed captioning.

For example, if character information that forms a footer of the packet is lost by overwriting, this packet will end up being made up of only a header and a payload. When such a packet is recorded in the recording unit 106, a decoder for displaying closed captioning cannot decode this packet, and an error will result. This hampers normal reproduction of the closed caption data.

On the other hand, if character information that forms the header of the packet is lost by overwriting, the packet will end up being made up of only the payload and the footer. However, even if such a packet is recorded in the recording unit 106, the decoder has a property of being able to ignore such a packet in reproduction processing. In other words, the loss of the header of the packet will not affect the decoding of character information, except that data which forms the packet is dropped.

This property is exploited in the header abandonment processing. When the memory usage of the memory area exceeds a predetermined threshold value, the read controlling unit 302 instructs the information checking unit 304 to judge whether character information read by the reading unit 303 corresponds to a packet header. If so, the read controlling unit 302 instructs the reading unit 303 to read from the memory area 48-bit data starting from the read character information, in other words character information of three consecutive frames, and abandon the read data. This is called the header abandonment.

The threshold value mentioned here is set at 80 bits, i.e. the amount of five frames of character information, for each of first and second character information.

Here, even when the memory usage of the memory area exceeds the threshold value, if the information checking unit 304 judges that the character information read from the memory area is null, then the abandonment of the null character information takes precedence over the header abandonment processing.

Thus, the read controlling unit 302 issues instructions to each construction element in the character information recording controlling unit 103, and exercises the TBC character information control to read character information from the memory 301 and continuously record it to the recording unit 106.

The information checking unit 304 includes a CPU and a storage medium such as a ROM. In the anti-overflow control, the information checking unit 304 refers to character codes in character information received from the reading unit 303, and judges whether the character codes are null. If the character codes are null, the information checking unit 304 informs the read controlling unit 302 and the information processing unit 305 as such.

Also, in the header abandonment, the information checking unit 304 refers to the character codes in the character information received from the reading unit 303, and judges whether the character codes correspond to the start of a packet. If so, the information checking unit 304 informs the read controlling unit 302 as such, and abandons the character information.

This operation of referring to the character codes of the character information and judging whether the character codes are null or correspond to the start of a packet is hereafter called "syntactic analysis".

By the way, DVD recording standards prohibit data which contains an error caused by noise or the like, from being recorded as it is. Hence it is necessary to correct such error data before recording it.

The information checking unit 304 executes parity checking on character information which has undergone the normal control or the anti-overflow control, before it is outputted from the outputting unit 307.

Specifically, the information checking unit 304 receives character information of one frame, i.e. 16-bit first character information (16-bit second character information) for displaying two characters on the same screen, from the reading unit 303. If the character information is not abandoned as a result of the normal control or the anti-overflow control, the information checking unit 304 performs parity checking in units of 8 bits corresponding to one character.

Character information for one character has the structure shown in the middle of FIG. 4, where it is made up of a parity bit and 7-bit data (ASCII, etc.).

In any of two sets of 8-bit character information contained in 16-bit character information, if the number of bits showing "1" is not odd in the 8 bits, the information checking unit 304 judges that the 7-bit data has an error, informs the read controlling unit 302 and the information processing unit 305 of the error, and outputs the 16-bit character information (hereinafter, "inaccurate character information") that includes the 8-bit error-detected character information, to the information processing unit 305.

If the number of bits showing "1" is odd in each of the two sets of 8-bit character information in the 16-bit character information, on the other hand, the information checking unit 304 outputs the 16-bit character information (hereinafter, "accurate character information") to the outputting unit 307.

The information processing unit 305 receives the inaccurate character information and the parity check result from the information checking unit 304. The information processing unit 305 then corrects the character code and parity bit that constitute the 8-bit error-detected character information, and outputs the 16-bit character information (hereinafter, "corrected character information") that includes the corrected 8-bit character information, to the outputting unit 307.

To be more specific, the information processing unit 305 replaces the character code in the 8-bit error-detected character information with a character code value "7f" representative of a box filled in with black (hereinafter, "solid block"), and changes the parity bit in the 8-bit error-detected character information to show a correct parity.

The above operation of correcting the parity bit by the information checking unit 304 and the information processing unit 305 in accordance with the DVD recording standards is hereafter called "parity correction".

The NULL generating unit 306 generates character information of one frame made up of null character codes, and outputs it to the outputting unit 307, when instructed by the read controlling unit 302.

More specifically, the NULL generating unit 306 generates, as the one-frame null character information, two sets of 8-bit data in each of which a 7-bit null character code, i.e. a character code value "00", is accompanied by a parity bit.

The outputting unit 307 continuously outputs accurate character information, corrected character information, or null character information, to the recording unit 106 in sync with the internal reference clock outputted from the clock generating unit 105, under the control of the read controlling unit 302.

Figure 10:
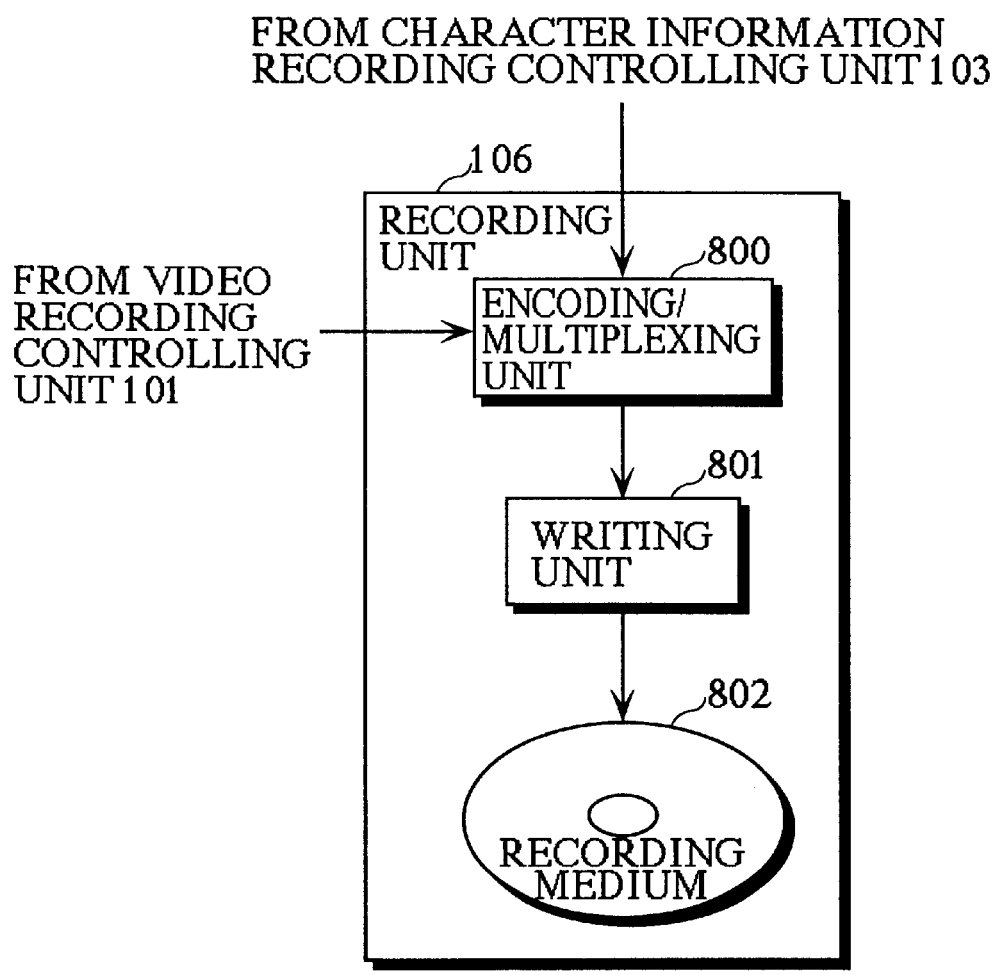
FIG. 10 is a functional block diagram of a recording unit shown in FIG. 2.

FIG. 10 is a functional block diagram of the recording unit 106.

The recording unit 106 is roughly made up of an encoding/multiplexing unit 800, a writing unit 801, and a recording medium 802 such as a DVD.

The encoding/multiplexing unit 800 receives character information from the character information recording controlling unit 103, and also receives video information from the video recording controlling unit 101. The encoding/multiplexing unit 800 then encodes and multiplexes the received character and video information in accordance with the DVD recording standards, and outputs the result (DVD data) to the writing unit 801.

The writing unit 801 writes the DVD data onto the DVD.

Figure 11:
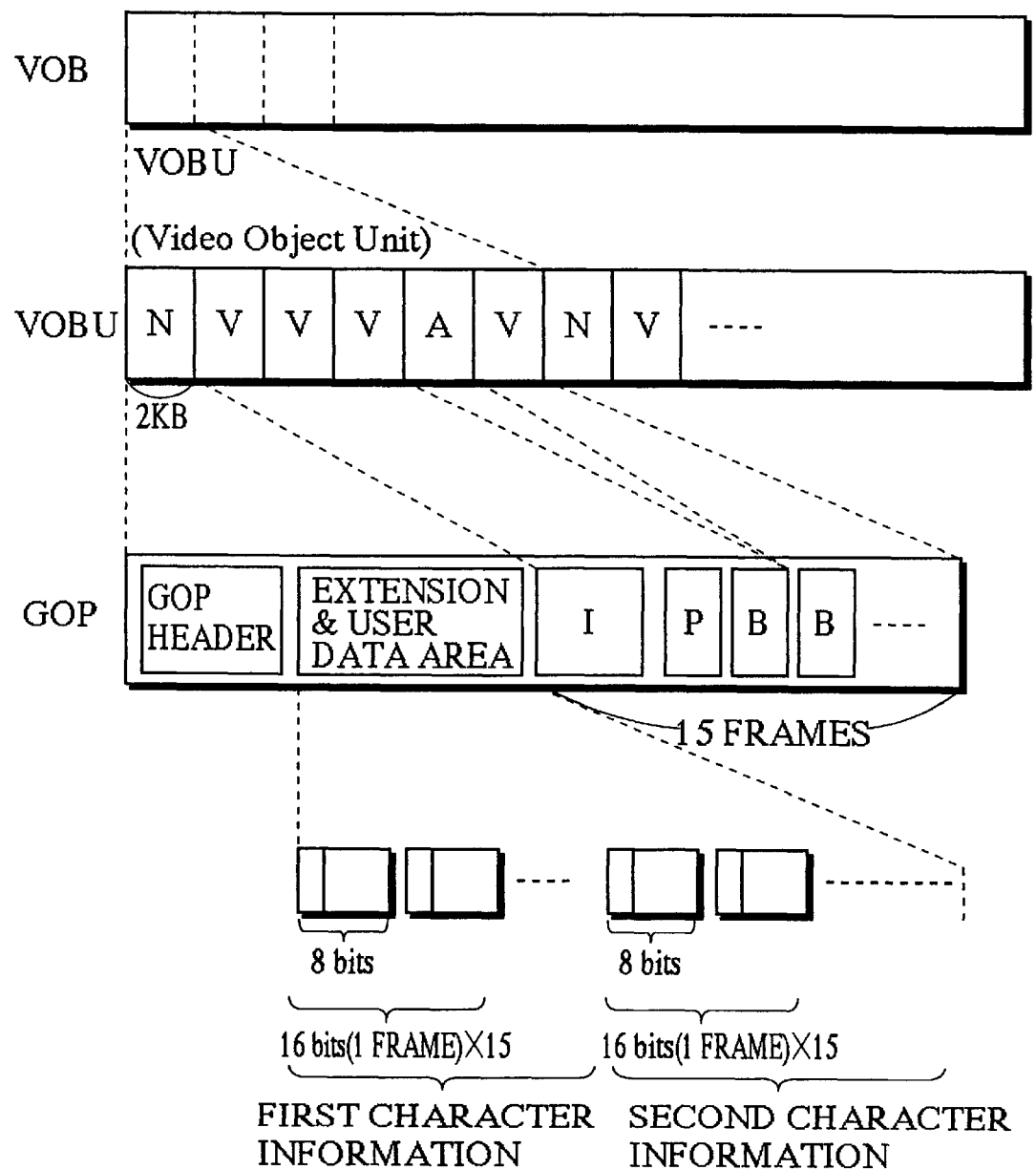
FIG. 11 shows a logical structure of data outputted from an encoding/multiplexing unit shown in FIG. 10.

FIG. 11 shows a logical structure of data outputted from the encoding/multiplexing unit 800.

In the DVD recording standards, a VOB (Video Object) is a data unit for recording video information and audio data for one TV program or the like. In the VOB, a VOBU (Video Object Unit) is a data unit of video information and audio data equivalent to 0.4 to 1 second.

The VOBU stores a navigation pack of 2 kilobytes carrying information such as a buffer size required for reproduction and a transfer rate, a plurality of video packs carrying video information, and at least one audio pack carrying audio data. The audio data is no related to the invention and so its explanation is omitted here.

The VOBU is composed of one or two GOPs (Group Of Picture). A GOP has a GOP header storing a time code and the like, an extension & user data area in which user data can be set freely, I pictures, P pictures, and B pictures. The I, P, and B pictures correspond to image data of 15 frames.

The encoding/multiplexing unit 800 stores first character information and second character information corresponding to 15 frames, into the extension & user data area of the GOP.

In the DVD recording standards, a flag showing the presence or absence of character information is prohibited from being changed within one VOB which is a unit of recording. Suppose there is mixed data of a program which contains closed captioning and a commercial which may not contain closed captioning. To record such data on the DVD as a single VOB while conforming to the DVD recording standards, the flag must be set either to show the presence of character information throughout the program and the commercial, or to show the absence of character information throughout the program and the commercial.

Here, it may be conceivable that the encoding/multiplexing unit 800 divides such a VOB at a point where the state of the presence or absence of character information changes, before recording video and character information. However, the DVD recording standards limit the maximum number of VOBs within one disk to 99, so that the number of VOBs cannot be increased so easily.

Accordingly, even when information on line 21 of a video signal shows the absence of character information, the encoding/multiplexing unit 800 outputs DVD data as a single VOB in which the flag invariably shows the presence of character information, in other words line 21 switch specified by the DVD recording standards is always held ON.

Figure 12:
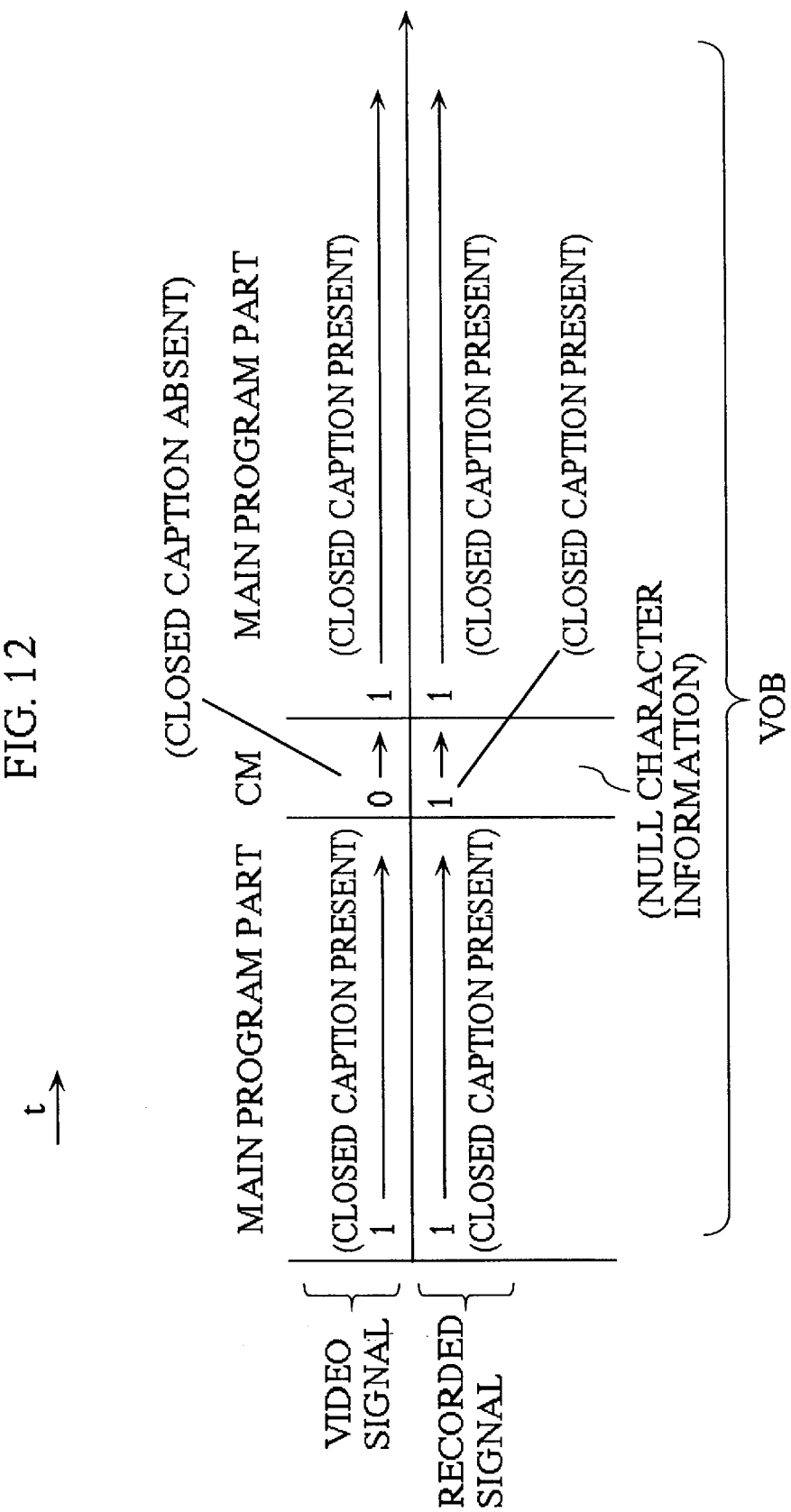

FIG. 12 illustrates a procedure of recording DVD data under the DVD recording standards, where line 21 switch is held ON.

In the figure, the flag showing the presence or absence of character information on line 21, in other words line 21 switch based on the DVD recording standards, is kept at "1" to show the presence of character information, regardless of whether character information is actually present or not.

Even if line 21 switch is held ON when there is actually no character information on line 21 of a video signal, null character information which has been generated under the anti-underflow control of the read controlling unit 302 is present in the video signal received by the encoding/multiplexing unit 800, so that the above setting of the flag should not cause any problem.

The following is a description of the operation of the video recording device 1.

Figure 13:
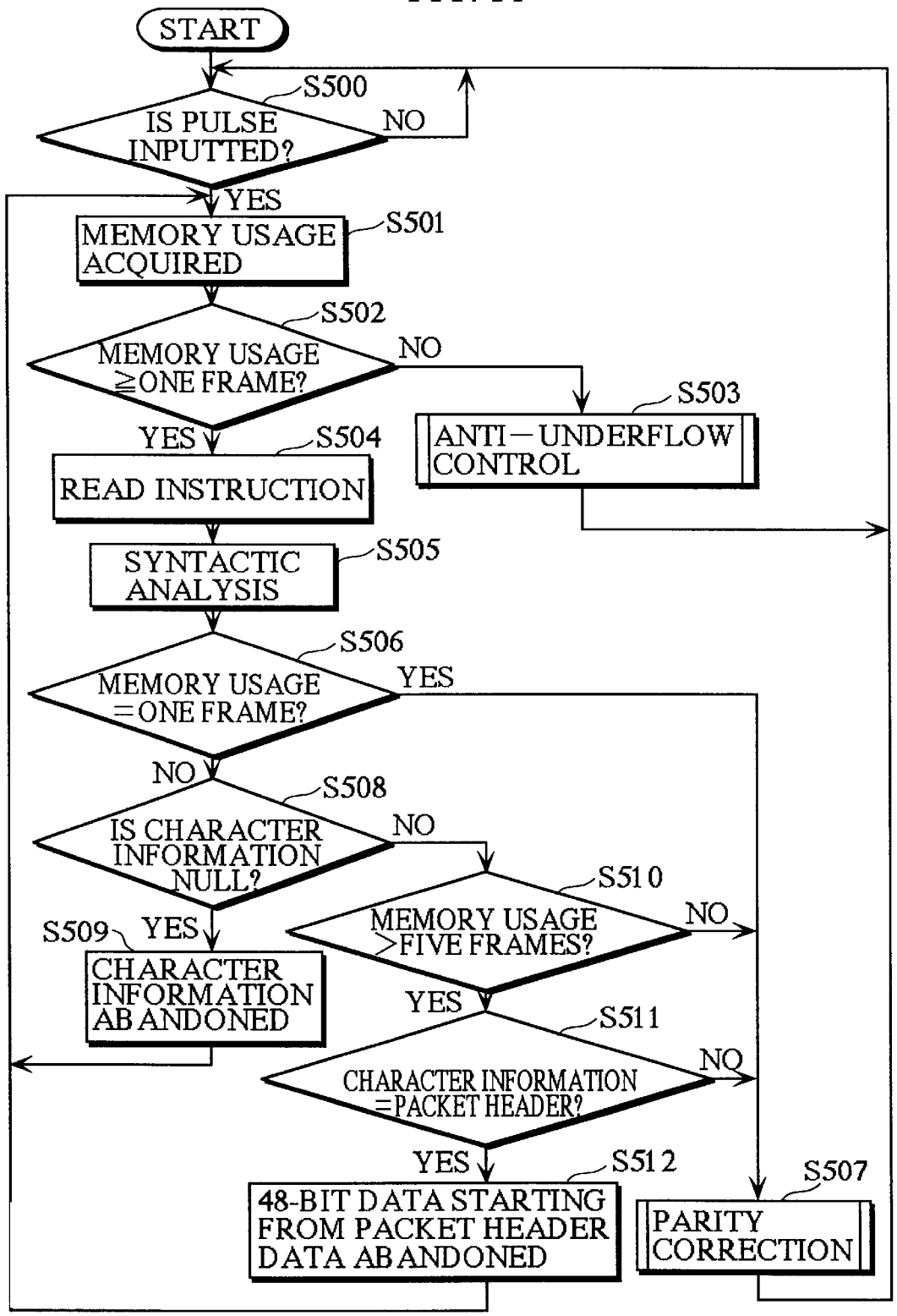
FIG. 13 is a flowchart of TBC character information control, taking first character information as an example.

FIG. 13 is a flowchart of the TBC character information control, taking first character information as an example.

The read controlling unit 302 checks whether a pulse is inputted from the clock generating unit 105 (S500). On detecting a pulse input, the read controlling unit 302 inquires of the memory 301 about the memory usage of the first memory area, and receives the response from the memory 301 (S501). The read controlling unit 302 judges whether the memory usage of the first memory area is no smaller than the amount of first character information corresponding to one frame, i.e. 16 bits (reference data amount) (S502). If the memory usage is smaller than the reference data amount, the read controlling unit 302 exercises anti-underflow control (described later) (S503), and returns to step S500 to wait for the next pulse input from the clock generating unit 105.

If the memory usage of the first memory area is equal to or greater than the reference data amount, the read controlling unit 302 instructs the reading unit 303 to read one-frame first character information of 16 bits stored at the top of the queue in the first memory area, from the memory 301 (S504).

The reading unit 303 reads the first character information from the memory 301, and outputs it to the information checking unit 304.

The information checking unit 304 refers to character codes included in the received first character information, and performs syntactic analysis to determine whether the character codes are null character codes, character codes corresponding to the start of a packet, or else (S505). The information checking unit 304 then informs the read controlling unit 302 and the information processing unit 305 of the analysis result.

Following this, the read controlling unit 302 judges whether the memory usage of the first memory area is equal to the reference data amount (S506). If the memory usage is equal to the reference data amount, the read controlling unit 302 performs parity correction (described later) (S507), and returns to step S500 to wait for the next pulse input from the clock generating unit 105.

If the memory usage is not equal to the reference data amount, in other words if the memory usage exceeds the reference data amount, the read controlling unit 302 exercises anti-overflow control. Here, the read controlling unit 302 refers to the analysis result sent from the information checking unit 304, to judge whether the character codes in the first character information are null (S508). If the character codes are null, the read controlling unit 302 instructs the information checking unit 304 to abandon the first character information.

The information checking unit 304 accordingly abandons the first character information (S509).

The read controlling unit 302 then immediately returns to step S501 to inquire of the memory 301 about the memory usage of the first memory area, and repeats the subsequent steps.

If, on the other hand, the analysis result shows that the character codes in the first character information are not null in step S508, the read controlling unit 302 judges whether the memory usage exceeds the amount of first character information corresponding to five frames, i.e. 80 bits (S510). If the memory usage does not exceed five frames of first character information, the read controlling unit 302 performs parity correction (S507), and returns to step S500 to wait for the next pulse input from the clock generating unit 105.

Meanwhile, if the memory usage exceeds five frames of first character information, the read controlling unit 302 judges, based on the analysis result, whether the character codes in the first character information shows the start of a packet (S511). If not, the read controlling unit 302 performs parity correction (S507), and returns to step S500 to wait for the next pulse input from the clock generating unit 105.

If the character codes shows the start of a packet, the read controlling unit 302 instructs the information checking unit 304 to abandon the first character information, and instructs the reading unit 303 to read from the memory 301 first character information of two consecutive frames stored in the queue of the first memory area immediately following the abandoned first character information. The reading unit 303 reads the first character information of two frames from the memory 301, and passes it to the information checking unit 304. The read controlling unit 302 instructs the information checking unit 304 to abandon the first character information of two frames (S512).

As a result of this header abandonment, the first character information of three consecutive frames starting from the first character information corresponding to the start of the packet is abandoned by the information checking unit 304.

Though the above explanation concerns only the TBC character information control for first character information, the same procedure is applied to second character information. In this case, the second character information and the second memory area respectively substitute for the first character information and the first memory area, in the above explanation.

Figure 14:
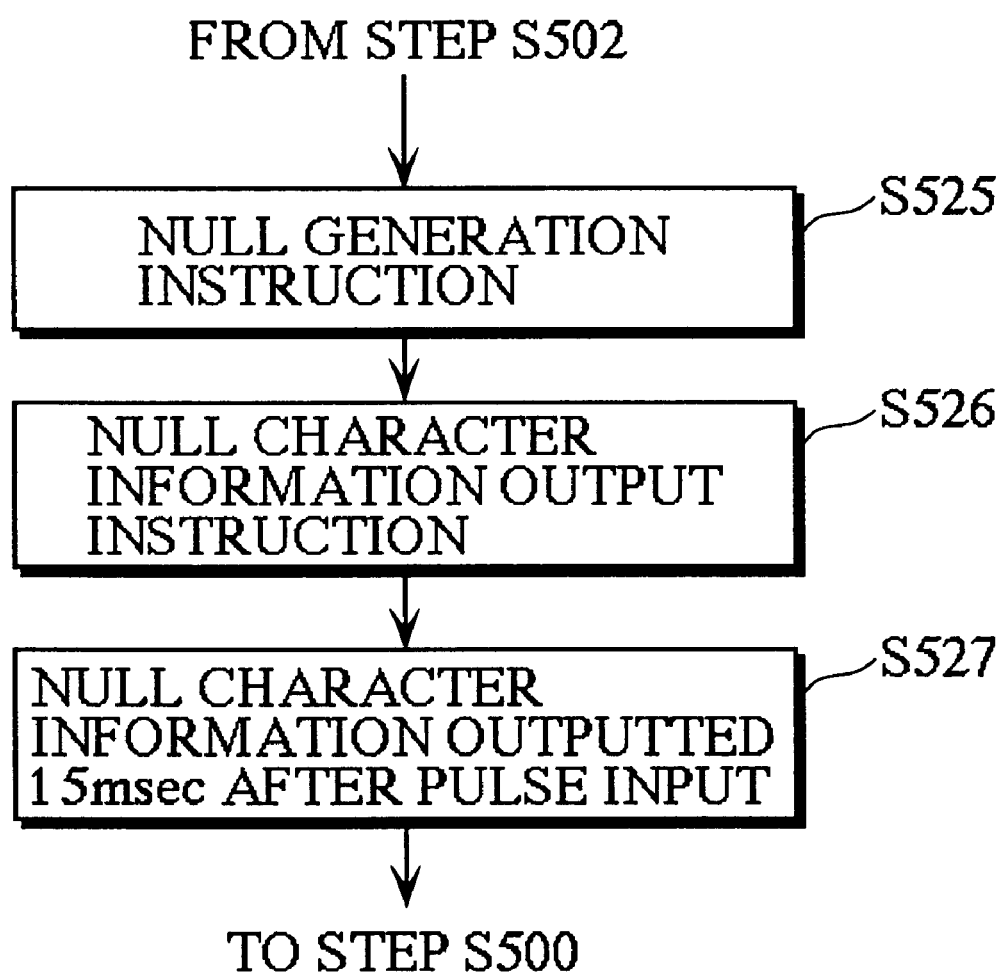
FIG. 14 is a flowchart of anti-underflow control.

FIG. 14 is a flowchart of the anti-underflow control.

The read controlling unit 302 instructs the NULL generating unit 306 to generate character information of one frame made up of null character codes (S525).

The NULL generating unit 306 accordingly generates the null character information and outputs it to the outputting unit 307.

The read controlling unit 302 instructs the outputting unit 307 to output the null character information (S526).

The outputting unit 307 outputs the null character information to the recording unit 106, when 15 msec elapses after the pulse input in step S500 (S527). After this, the read controlling unit 302 returns to step S500 to wait for the next pulse input from the clock generating unit 105.

Figure 15:
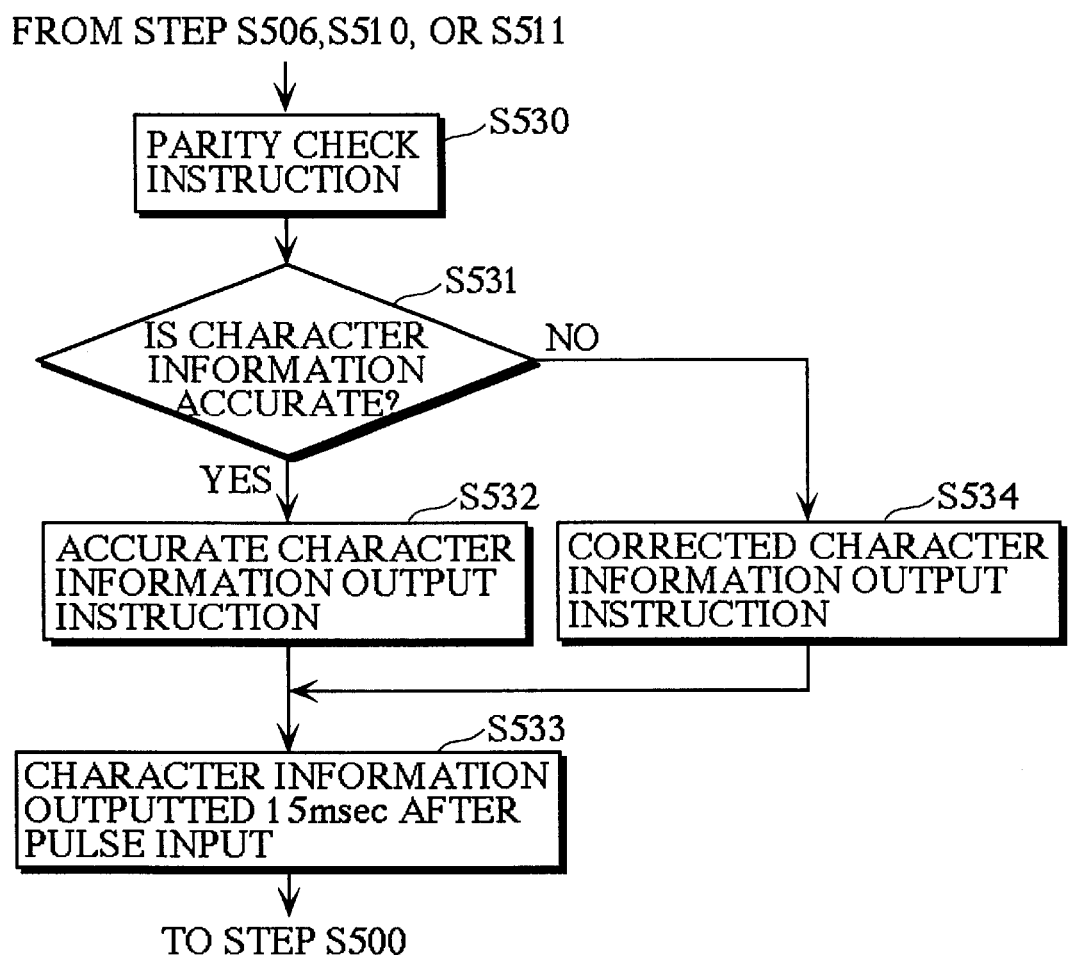
FIG. 15 is a flowchart of parity correction, taking first character information as an example.

FIG. 15 is a flowchart showing the parity correction, taking first character information as an example.

The read controlling unit 302 instructs the information checking unit 304 to perform parity checking on the first character information received from the reading unit 303 (S530).

The information checking unit 304 performs parity checking on the first character information, to judge whether two parity bits included in the first character information each show a correct parity. The information checking unit 304 informs the read controlling unit 302 of the parity check result.

Based on the parity check result, the read controlling unit 302 judges whether two character codes in the first character information are accurate (S531). If they are accurate, the read controlling unit 302 instructs the outputting unit 307 to output the first character information (S532).

The outputting unit 307 receives the first character information from the information checking unit 304, and outputs it to the recording unit 106 15 msec after the pulse input in step S500 (S533). The read controlling unit 302 then returns to step S500 to wait for the next pulse input from the clock generating unit 105.

If any of the two character codes in the first character information is judged as not being accurate in step S531, the information checking unit 304 passes the first character information to the information processing unit 305 as inaccurate character information. The information processing unit 305 corrects the inaccurate character information by correcting the error character code and its accompanying parity bit, and passes the corrected character information to the outputting unit 307. The read controlling unit 302 instructs the outputting unit 307 to output the corrected character information (S534).

The outputting unit 307 outputs the first character information received from the information processing unit 305, to the recording unit 106 15 msec after the pulse input in step S500 (S533). The read controlling unit 302 then returns to step S500 to wait for the next pulse input from the clock generating unit 105.

The above explanation concerns only the parity correction for the first character information, but the same procedure is applied to second character information.

Figure 16:
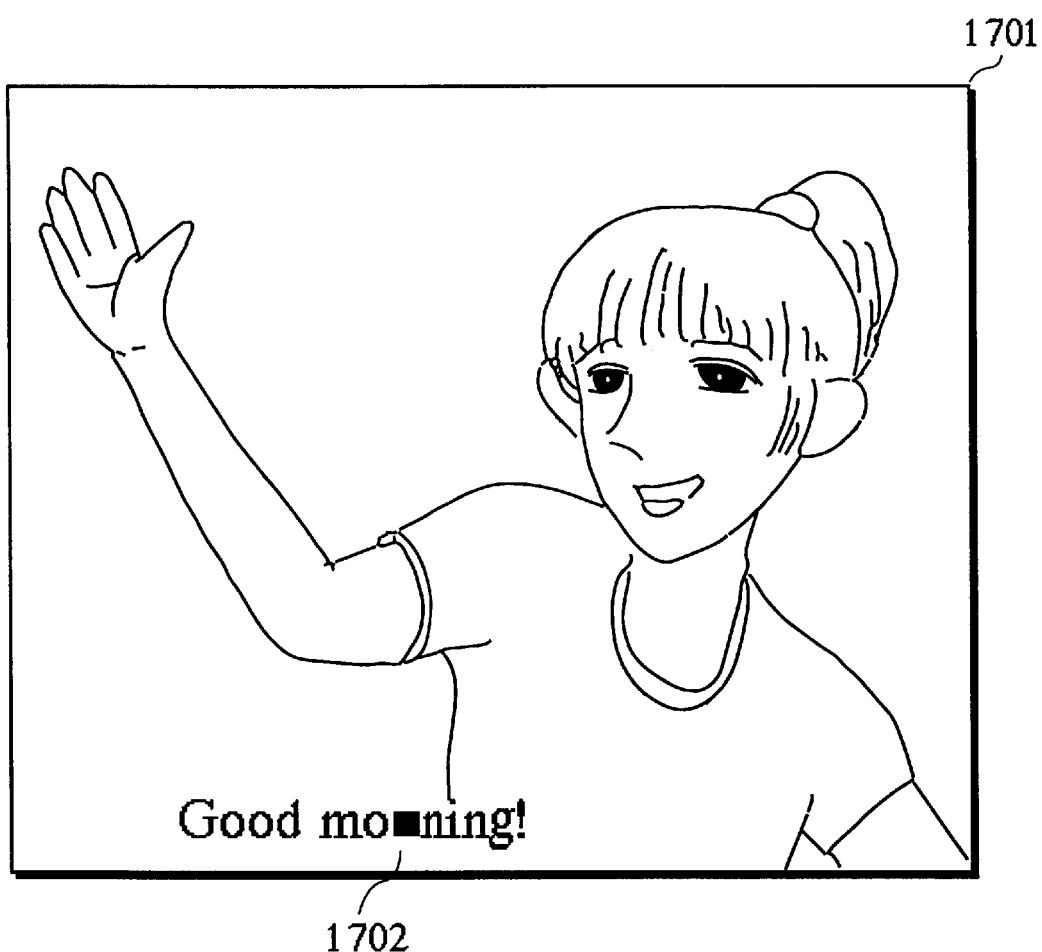
FIG. 16 shows an example display when character information which has been parity-checked and recorded in the recording unit is reproduced together with a video.

FIG. 16 shows an example display when character information which has been parity-checked and then recorded in the recording unit 106 is reproduced together with a video.

For instance, when the information checking unit 304 detects an error in a character code representing the character 1702 "r" of a character string "Good morning!", that character code is replaced with a character code representative of a solid block, as a result of which "Good m■ning!" is displayed.

FIG. 17 is an example application of the video recording device 1 of the invention.

A DVD recorder 1801 is equipped with the video recording device 1 of the invention, as well as a receiving unit for receiving a TV broadcast wave and a reproducing unit for reproducing video and character information recorded on a DVD.

An antenna 1802 is tuned with an NTSC TV broadcast wave.

A display device 1803 is a TV receiver for receiving and displaying an NTSC video signal.

Thus, with the video recording device 1 of the embodiment, when recording character information together with video information using a TBC based on a video signal on which the character information and the video information are multiplexed, the character information can be recorded as faithfully as possible.

The above embodiment describes the case where the memory 301 is positioned upstream from the information checking unit 304, the information processing unit 305, and the NULL generating unit 306 in the character information recording controlling unit 103, from the viewpoint of the flow of character information. However, the memory 301 may instead be positioned downstream from these construction elements.

In other words, the above described normal control, anti-underflow control, anti-overflow control, header abandonment, and parity correction may be performed before character information is stored in the memory 301.

FIG. 18 is a functional block diagram showing an example construction of a character information recording controlling unit 390, as a modification of the character information recording controlling unit 103.

This character information recording controlling unit 390 is roughly made up of an information checking unit 400, a writing unit 401, a memory 402, a write controlling unit 403, an information processing unit 404, a NULL generating unit 405, and a reading unit 406.

The information checking unit 400 includes a CPU and a storage medium such as a ROM, and basically has the same function as the information checking unit 304. The differences with the above embodiment lies in that the information checking unit 400 receives character information from the character information extracting unit 102 instead of the reading unit 303, and outputs character information to the writing unit 401 instead of the outputting unit 307.

The writing unit 401 basically has the same function as the writing unit 300. The differences with the embodiment lies in that the writing unit 401 receives accurate character information from the information checking unit 400 and corrected character information from the information processing unit 404, instead of receiving character information from the character information extracting unit 102.

The memory 402 is a storage medium such as a DRAM, and has the same function as the memory 301.

The information processing unit 404 basically has the same function as the information processing unit 305, but differs in that it outputs corrected character information not to the outputting unit 307 but to the writing unit 401.

The NULL generating unit 405 basically has the same function as the NULL generating unit 306, but differs in that it outputs null character information not to the outputting unit 307 but to the writing unit 401.

The write controlling unit 403 basically has the same function as the read controlling unit 302, but differs in the following point.

In the write controlling unit 403, the reference data amount is not the amount of character information corresponding to one frame, but the amount of character information corresponding to N frames (N being a natural number no smaller than 2).

Which is to say, the write controlling unit 403 exercises normal control, anti-underflow control, anti-overflow control, header abandonment, and parity correction, so that the amount of character information corresponding to at least one frame is always stored in the memory 301 whether it is accurate character information, corrected character information, or null character information.

With this construction, when recording character information together with video information using a TBC based on a video signal on which the character information and the video information are multiplexed, the character information can be recorded as faithfully as possible.

The above embodiment describes the case where the ADC 100 receives an analog signal of NTSC, which is the dominant standard in the United States, on which video information, character information such as closed caption data, and a synchronous signal are multiplexed, from a TV broadcast station or the like via the receiver. However, when the video recording device of the invention is used in Europe, the ADC 100 may receive an analog signal of PAL (Phase Alternation by Line) which is dominant in Europe.

In such a case, one frame of video information is image information for 40 msec. Also, teletext which is a widely-used text broadcasting system in Europe may be employed as character information, instead of closed captioning which is more common in the United States. The invention is applicable to teletext, too.

The above embodiment describes the case where the character information extracting unit 102 extracts character information from a digital video signal outputted from the ADC 100 and outputs it to the character information recording controlling unit 103. However, the character information extracting unit 102 may receive an analog video signal directly from the receiver, extract character information from the analog video signal, and output it to the character information recording controlling unit 103.

The above embodiment describes the case where the reference data amount is the amount of character information corresponding to one frame, but this is not a limit for the invention. For example, the amount of character information corresponding to two to four frames is feasible as the reference data amount in practical use.

The above embodiment describes the case where, when an error is detected in character information as a result of parity checking, parity correction is carried out whereby a character code in the character information is replaced with a character code representative of a solid block and a parity bit in the character information is changed to show a correct parity. However, the character code may be replaced with a character code representative of a character which seems to be correct, based on a character string formed by character codes preceding and succeeding the error character code.

In this case, the NULL generating unit 306 is equipped with a storage medium such as a ROM that stores a word dictionary. The NULL generating unit 306 detects codes that represent spaces between adjacent words, recognizes a character string sandwiched by the spaces as a single word, searches the word dictionary for the word corresponding to the character string, and replaces the error character code with a character code which represents a correct character found in the word dictionary.

Also, parity correction may be performed in such a way that only the parity bit is corrected without correcting the character code in the character information.

Alternatively, the character code in the character information may be replaced with a null character code, instead of a character code representative of a solid block.

In FIG. 16, for example, when the information checking unit 304 detects an error in the character code representing the character 1702 "r" of the character string "Good morning!", that character code is replaced with a null character code, as a result of which "Good morning!" is displayed.

The above embodiment describes the case where the encoding/multiplexing unit 800 receives character information and video information, encodes and multiplexes the character and video information, and outputs it to the writing unit 801. However, the encoding/multiplexing unit 800 may also receive an audio signal, encode and multiplex the audio signal together with the character and video information, and output it to the writing unit 801.

The above embodiment describes an example of recording an analog video signal, though the invention is also applicable to the recording of a digital video signal using a TBC.

In such a case, the ADC 100 and the character information extracting unit 102 can be omitted from the video recording device 1, which is instead equipped with a demultiplexing circuit for demultiplexing video information, character information, and synchronous information which are multiplexed on a video signal.

The above embodiment describes the case where the video recording device 1 includes the writing unit 801 and the recording medium 802. However, the video recording device 1 may not include these construction elements, but output data to an outside recorder via the encoding/multiplexing unit 800.

The above embodiment describes the case where the encoding/multiplexing unit 800 outputs DVD data in which the flag showing the presence or absence of character information, i.e. line 21 switch based on the DVD recording standards, is always held ON even if character information is actually not present on line 21. However, the encoding/multiplexing unit 800 may divide a VOB when the state of the presence or absence of character information changes. Alternatively, if character information is absent at the beginning of a VOB, the encoding/multiplexing unit 800 may keep line 21 switch OFF throughout the VOB even if character information appears later. In this case, no character information is recorded on the DVD.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

What is claimed is:

1. A video recording device for recording a plurality of sets of video information that include a plurality of sets of character information, into a recording medium, comprising:

a receiving unit operable to sequentially receive the plurality of sets of video information at a receive frequency which may vary;

an extracting unit operable to sequentially extract the plurality of sets of character information from the received plurality of sets of video information;

a video outputting unit operable to output the received plurality of sets of video information one at a time at a fixed output frequency which does not depend on the receive frequency, wherein when there is a frequency discrepancy between the output frequency and the receive frequency, the video outputting unit (1) skips a set of video information or (2) outputs a set of video information which was once outputted, again;

a character outputting unit operable to output the extracted plurality of sets of character information one at a time at the output frequency, in the extracted order;

a recording unit operable to record the outputted plurality of sets of video information and the outputted plurality of sets of character information in combination, into the recording medium in the outputted order; and an abandoning unit operable to, whenever a predetermined condition is met, (a) judge whether a value included in a set of character information extracted by the extracting unit is null, (b) abandon the set of character information whose value is judged as being null, and (c) instruct the character outputting unit to skip the abandoned set of character information and instead output a set of character information immediately following the abandoned set of character information.

2. The video recording device of claim 1, further comprising:
   a buffer operable to temporarily store data, in which the plurality of sets of character information extracted by the extracting unit are sequentially inputted; and
   a data amount detecting unit operable to detect an amount of data currently stored in the buffer,
   wherein the predetermined condition is that the amount of data currently stored in the buffer is no smaller than a first threshold value,
   the character outputting unit retrieves a set of character information which has been stored for a longest time in the buffer, and outputs the retrieved set of character information, and
   when the predetermined condition is met, the retrieved set of character information is subjected to the judgement by the abandoning unit, before being outputted by the character outputting unit.

3. The video recording device of claim 2, further comprising
   a null information generating unit operable to generate a set of null information whose value is null,
   wherein if the amount of data currently stored in the buffer is below a second threshold value, the character outputting unit outputs the set of null information generated by the null information generating unit, as a set of character information.

4. The video recording device of claim 3,
   wherein the recording medium is a DVD,
   at least one of the plurality of sets of video information received by the receiving unit includes no set of character information,
   each of the received plurality of sets of video information includes inclusion information showing whether the set of video information includes a set of character information or not, and
   the recording unit
   (a) attaches a flag based on DVD recording standards which shows the inclusion of a set of character information, to each of the plurality of sets of video information outputted from the video outputting unit, regardless of whether the inclusion information of each of the plurality of sets of video information shows the inclusion or non-inclusion of a set of character information, and
   (b) records the combination of the outputted plurality of sets of video information and the outputted plurality of sets of character information, into the recording medium as a single VOB (Video Object).

5. The video recording device of claim 4,
   wherein the flag is line 21 switch based on the DVD recording standards.

6. The video recording device of claim 1,
   wherein a value included in at least one of the plurality of sets of character information extracted by the extracting unit is a character code used for closed captioning.

7. The video recording device of claim 1,
   wherein the recording medium is a DVD,
   at least one of the plurality of sets of video information received by the receiving unit includes no set of character information,
   each of the received plurality of sets of video information includes inclusion information showing whether the set of video information includes a set of character information or not, and
   the recording unit
   (a) attaches a flag based on DVD recording standards which shows the inclusion of a set of character information, to each outputted set of video information whose inclusion information shows the inclusion of a set of character information,
   (b) attaches a flag based on the DVD recording standards which shows the non-inclusion of a set of character information, to each outputted set of video information whose inclusion information shows the non-inclusion of a set of character information, and
   (c) records the combination of the outputted plurality of sets of video information and the outputted plurality of sets of character information into the recording medium as separate VOBs, the VOBs being separated from each other whenever the flag changes.

8. The video recording device of claim 7,
   wherein the flag is line 21 switch based on the DVD recording standards.

9. The video recording device of claim 1,
   wherein the recording medium is a DVD,
   at least one of the plurality of sets of video information received by the receiving unit includes no set of character information,
   each of the received plurality of sets of video information includes inclusion information showing whether the set of video information includes a set of character information or not, and
   the recording unit
   (a) attaches, when inclusion information of a set of video information outputted first among the plurality of sets of video information shows the inclusion of a set of character information, a flag based on DVD recording standards which shows the inclusion of a set of character information, to each of the plurality of sets of video information outputted from the video outputting unit, regardless of whether inclusion information of each of the plurality of sets of video information other than the first outputted set of video information shows the inclusion or non-inclusion of a set of character information,
   (b) attaches, when the inclusion information of the first outputted set of video information shows the non-inclusion of a set of character information, a flag based on the DVD recording standards which shows the non-inclusion of a set of character information, to each of the outputted plurality of sets of video information, regardless of whether the inclusion information of each of the plurality of sets of video information other than the first outputted set of video information shows the inclusion or non-inclusion of a set of character information, and
   (c) records the combination of the outputted plurality of sets of video information and the outputted plurality of sets of character information, into the recording medium as a single VOB.

10. The video recording device of claim 9,
    wherein the flag is line 21 switch based on the DVD recording standards.

11. The video recording device of claim 2,
    wherein the plurality of sets of character information extracted by the extracting unit form packet data that contains a packet header,
    the video recording device further comprising
    a judging unit operable to judge whether a value included in the set of character information retrieved from the buffer shows the start of the packet header, wherein if the amount of data currently stored in the buffer exceeds a third threshold value which is larger than the first threshold value, and if the judging unit judges that the value in the retrieved set of character information shows the start of the packet header, the abandoning unit (a) abandons a predetermined number of consecutive sets of character information starting from the set of character information whose value is judged as showing the start of the packet header, and (b) instructs the character outputting unit to skip the abandoned sets of character information, and instead output a set of character information immediately following the abandoned sets of character information.

12. The video recording device of claim 1, wherein each of the plurality of sets of character information extracted by the extracting unit includes error information which shows whether an error is present in a value included in the set of character information or not, the video recording device further comprising error judging unit operable to refer to error information in the set of character information extracted by the extracting unit, and judge whether the error information shows the presence or absence of an error, wherein when the error information shows the presence of an error, the character outputting unit changes the error information to show the absence of an error, and outputs the set of character information.

13. The video recording device of claim 12, wherein when the error information shows the presence of an error, the character outputting unit changes the error information to show the absence of an error, further changes a value included in the set of character information to a predetermined value, and outputs the set of character information.

14. The video recording device of claim 13, wherein the predetermined value is a character code which represents a box filled in with black.

15. The video recording device of claim 12, wherein the error information is a parity bit, and the character outputting unit changes a parity bit in the set of character information whose value is judged as having an error, to show a correct parity, and outputs the set of character information.

16. The video recording device of claim 12, wherein when the error information shows the presence of an error, the character outputting unit changes the error information to show the absence of an error, further changes a value included in the set of character information to a null value, and outputs the set of character information.

17. The video recording device of claim 12, further comprising:

a word storing unit storing a plurality of different words; and a character acquiring unit operable to (a) obtain a character string which seems to form a word, based on characters represented by values included in sets of character information preceding and following the set of character information whose value is judged as having an error, (b) search the word storing unit for a word corresponding to the obtained character string, to find a character which seems to be a correct character for a character represented by the value in the set of character information, and (c) generate a character code representative of the found character, wherein the character outputting unit changes the value in the set of character information to the generated character code, and outputs the set of character information.

18. The video recording device of claim 17, wherein the character acquiring unit obtains the character string, on an assumption that the character string ends right before a character other than an alphabet.

19. A video recording method for recording a plurality of sets of video information that include a plurality of sets of character information, into a recording medium, comprising:

a receiving step for sequentially receiving the plurality of sets of video information at a receive frequency which may vary;

an extracting step for sequentially extracting the plurality of sets of character information from the received plurality of sets of video information;

a video outputting step for outputting the received plurality of sets of video information one at a time at a fixed output frequency which does not depend on the receive frequency, wherein when there is a frequency discrepancy between the output frequency and the receive frequency, the video outputting step (1) skips a set of video information or (2) outputs a set of video information which was once outputted, again;

a character outputting step for outputting the extracted plurality of sets of character information one at a time at the output frequency, in the extracted order;

a recording step for recording the outputted plurality of sets of video information and the outputted plurality of sets of character information in combination, into the recording medium in the outputted order; and an abandoning step for, whenever a predetermined condition is met, (a) judging whether a value included in a set of character information extracted by the extracting step is null, (b) abandoning the set of character information whose value is judged as being null, and (c) instructing the character outputting step to skip the abandoned set of character information and instead output a set of character information immediately following the abandoned set of character information.

20. A video rate adjusting device, comprising:

an input accepting unit operable to sequentially accept a plurality of videos and a plurality of sets of character information;

a video outputting unit operable to skip part of the accepted plurality of videos, and output the remaining videos at a predetermined speed in the accepted order;

a character judging unit operable to judge, for each of the accepted plurality of sets of character information, whether a value included in the set of character information is null; and a character outputting unit operable to output, in a one-to-one correspondence with the videos outputted by the video outputting unit, sets of character information other than the sets of character information whose values are judged as being null, at the predetermined speed in the accepted order.

* * * * *